United States Patent
Machimura et al.

(10) Patent No.: US 8,401,302 B2
(45) Date of Patent: *Mar. 19, 2013

(54) IMAGE PROCESSING APPARATUS, IMAGE PROCESSING METHOD, AND PROGRAM

(75) Inventors: Masanori Machimura, Tokyo (JP); Tetsujiro Kondo, Tokyo (JP); Kazutaka Ando, Kanagawa (JP); Yasunobu Node, Tokyo (JP); Michimasa Obana, Tokyo (JP); Kei Hiraizumi, Kanagawa (JP); Masato Akao, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,365

(22) Filed: Nov. 14, 2011

(65) Prior Publication Data

US 2012/0057793 A1 Mar. 8, 2012

Related U.S. Application Data

(63) Continuation of application No. 11/799,055, filed on Apr. 30, 2007, now Pat. No. 8,077,978.

(30) Foreign Application Priority Data

May 1, 2006 (JP) ................ P2006-127661

(51) Int. Cl.
*G06K 9/00* (2006.01)
*G06K 9/46* (2006.01)
(52) U.S. Cl. .... 382/190; 382/181; 382/195; 375/240.08
(58) Field of Classification Search .......... 382/181, 382/190, 195, 173, 209, 217, 243; 358/471, 358/342, 403, 444, 448, 451, 452, 453, 335, 358/310; 430/204, 487, 218, 494, 244; 348/700, 348/E5.067, 231.3; 375/240.08

See application file for complete search history.

(56) References Cited

U.S. PATENT DOCUMENTS

| | | | | |
|---|---|---|---|---|
| 5,543,925 | A | * | 8/1996 | Timmermans ............... 386/219 |
| 7,031,385 | B1 | | 4/2006 | Inoue et al. |
| 7,787,750 | B2 | * | 8/2010 | Kondo et al. ............... 386/291 |
| 2004/0070685 | A1 | | 4/2004 | Kondo et al. |
| 2005/0262446 | A1 | | 11/2005 | Roh |

FOREIGN PATENT DOCUMENTS

| | | |
|---|---|---|
| EP | 1 826 763 | 8/2007 |
| EP | 1 826 764 | 8/2007 |
| JP | 2003-187217 | 7/2003 |
| JP | 2003-202944 A | 7/2003 |
| JP | 2005327242 A | 11/2005 |
| JP | 2006109005 A | 4/2006 |
| WO | 00/05718 | 2/2000 |

OTHER PUBLICATIONS

Office Action from Japanese Application No. 2006-127661, dated Jan. 13, 2011.

* cited by examiner

*Primary Examiner* — Sheela Chawan

(74) *Attorney, Agent, or Firm* — Lerner, David, Littenberg, Krumholz & Mentlik, LLP

(57) ABSTRACT

An image processing apparatus may include a feature quantity extraction unit configured to extract a feature quantity from an image, a setting unit configured to set setting information including a plurality of setting items used to perform processing upon the image so that a designated setting item can be changed among the setting items; and a recording unit configured to associate the setting information with a feature quantity of the image and record them.

18 Claims, 18 Drawing Sheets

IMAGE PROCESSING APPARATUS, IMAGE PROCESSING METHOD, AND PROGRAM

CROSS-REFERENCE TO RELATED APPLICATIONS

This application is a continuation of U.S. application Ser. No. 11/799,055, filed on Apr. 30, 2007, which claims priority from Japanese Patent Application No. JP 2006-127661 filed in the Japanese Patent Office on May 1, 2006, the entire content of which is incorporated herein by reference.

BACKGROUND OF THE INVENTION

1. Field of the Invention

The present invention relates to image processing apparatuses, image processing methods, and programs, and, more particularly, to an image processing apparatus and an image processing method capable of performing predetermined processing upon an original image and reproducing the processed image each time the original image is reproduced, and a program.

2. Description of the Related Art

Techniques allowing users to easily process images are becoming increasingly popular.

When editing of moving images captured by video cameras or the like is performed, linear editing is often employed. In linear editing, original image data is subjected to various processing operations while being reproduced, and the processed image data is then recorded on another recording medium.

In the case of the above-described linear editing, if the "copy once" rule is adopted for original image data, it is impossible to reproduce the original image data that has already been recorded on a recording medium such as a VTR (Video Tape Recorder) so as to edit it and record the edited image data.

Accordingly, in order to solve such a problem, a method of storing a process of providing instructions for editing an image in advance is disclosed in Japanese Unexamined Patent Application Publication No. 2003-202944.

SUMMARY OF THE INVENTION

In the case of linear editing, an original moving image is transmitted along with a time code that represents the elapsed time thereof, whereby editing of the original image can be performed using the time code. However, consumer-oriented VTRs have a time code function, but cannot transmit a time code with an image. Accordingly, the above-described process of providing instructions for editing an image cannot be synchronized with the image. Thus, even if a process of providing instructions for editing an image is stored in advance, it is difficult to accurately perform processing upon the image in synchronization with the reproduction of the image.

It may be desirable to provide an image processing apparatus and an image processing method capable of accurately performing predetermined processing upon an original image and reproducing the processed image each time the original image is reproduced without making modifications to the original image.

An image processing apparatus according to an embodiment of the present invention may include a feature quantity extraction unit configured to extract a feature quantity from an image; a setting unit configured to set setting information including a plurality of setting items used to perform processing upon the image so that a designated setting item can be changed among the setting items; and a recording unit configured to associate the setting information with a feature quantity of the image and record them.

The feature quantity extraction unit may extract a sum of pixel values of pixels included in a predetermined area configuring the image as a feature quantity.

The image processing apparatus according to an embodiment of the present invention may further include a synchronization unit configured to synchronize a feature quantity extracted from the image with a feature quantity recorded in the recording unit; and a reading unit configured to read out the setting information associated with a feature quantity synchronized with a feature quantity extracted from the image. When the read setting information is reset and is then recorded, the setting unit may set the setting information so that only a designated setting item may be changed among a plurality of setting items configuring the read setting information.

The image processing apparatus according to an embodiment of the present invention may further include a reflection unit configured to reflect processing based on the setting information set by the setting unit in the image, and displaying an image in which the processing has been reflected.

An image processing method or a program according to an embodiment of the present invention may include extracting a feature quantity from an image; setting information including a plurality of setting items used to perform processing upon the image so that a designated setting item can be changed among the setting items; and associating the setting information with a feature quantity of the image and recording them.

Thus, a feature quantity may be extracted from an image. Setting information which may include a plurality of setting items used to perform processing upon the image may be set so that a designated setting item can be changed among the setting items. The setting information may be associated with a feature quantity of the image, and may then be recorded along with the feature quantity of the image.

According to an embodiment of the present invention, predetermined information can be recorded. More particularly, according to an embodiment of the present invention, predetermined processing may be accurately performed upon an original image and the processed image may be reproduced each time the original image is reproduced without making modifications to the original image.

DETAILED DESCRIPTION

Before describing embodiments of the present invention, the correspondence between the features of the present invention and embodiments of the present invention disclosed in this specification or the accompanying drawings is discussed below. This description is intended to assure that embodiments supporting the present invention are described in this specification or the accompanying drawings. Thus, even if an embodiment in this specification or the accompanying drawings is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

Figure 3:
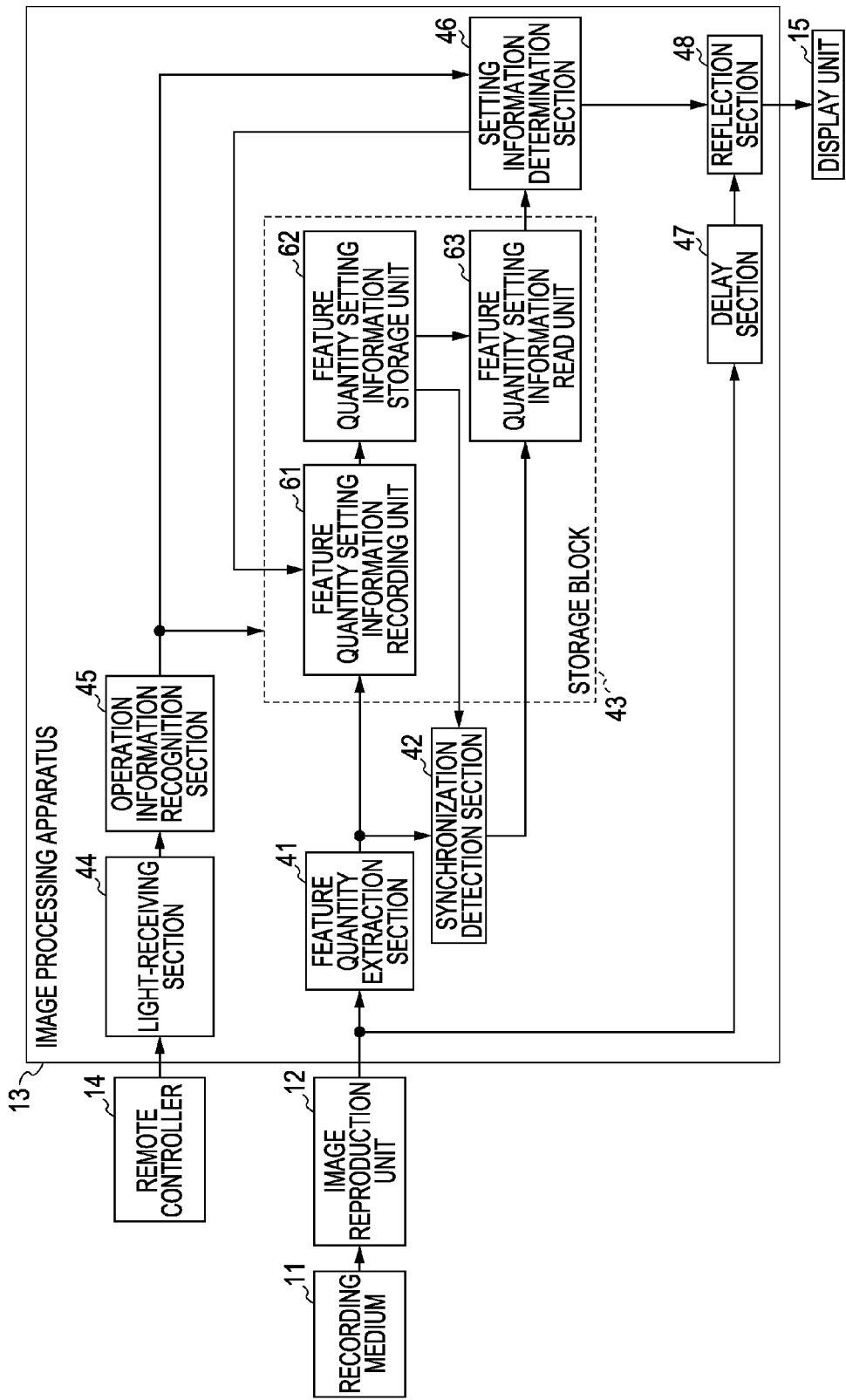
FIG. 3 is a block diagram showing a configuration of an image processing apparatus according to an embodiment of the present invention.

An image processing apparatus according to an embodiment of the present invention includes: a feature quantity extraction unit (for example, a feature quantity extraction section 41 shown in FIG. 3) configured to extract a feature quantity from an image; a setting unit (for example, a setting information determination section 46 shown in FIG. 3) configured to set setting information including a plurality of setting items used to perform processing upon the image so that a designated setting item can be changed among the setting items; and a recording unit (for example, a feature quantity setting information storage unit 62 shown in FIG. 3) configured to associate the setting information with a feature quantity of the image and record them.

Figure 16:
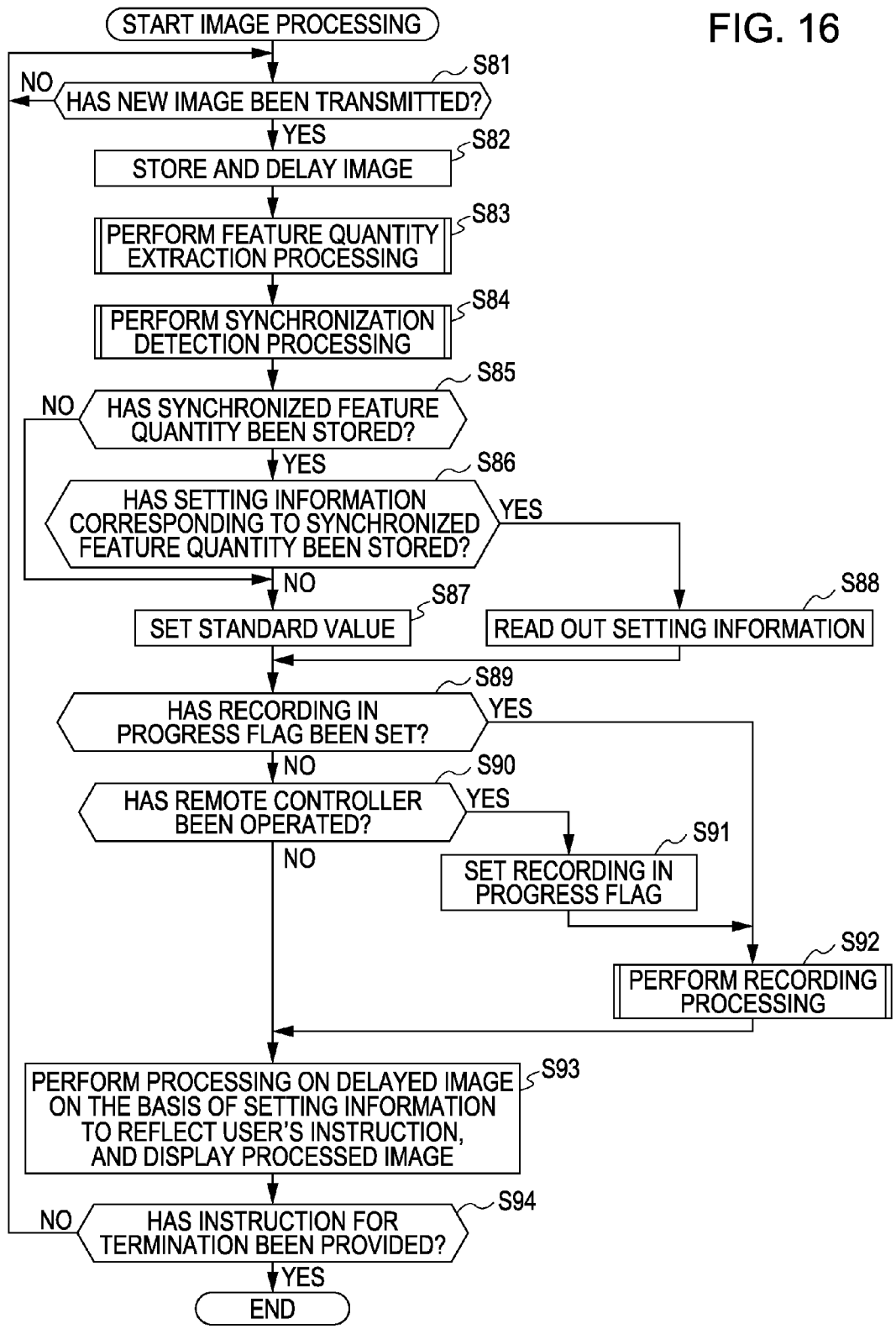
FIG. 16 is a flowchart describing image processing.

The feature quantity extraction unit can extract a sum of pixel values of pixels included in a predetermined area configuring the image as a feature quantity (for example, step S83 shown in FIG. 16).

The image processing apparatus according to an embodiment of the present invention further includes: a synchronization unit (for example, a synchronization detection section 42 shown in FIG. 3) configured to synchronize a feature quantity extracted from the image with a feature quantity recorded in the recording unit; and a reading unit (for example, a feature quantity setting information read unit shown in FIG. 3) configured to read out the setting information associated with a feature quantity synchronized with a feature quantity extracted from the image. When the read setting information is reset and is then recorded, the setting unit can set the setting information so that only a designated setting item can be changed among a plurality of setting items configuring the read setting information (for example, step S123 shown in FIG. 17).

The image processing apparatus according to an embodiment of the present invention further includes a reflection unit (for example, a reflection section 48 shown in FIG. 3) configured to reflect processing based on the setting information set by the setting unit in the image, and displaying an image in which the processing has been reflected.

Figure 17:
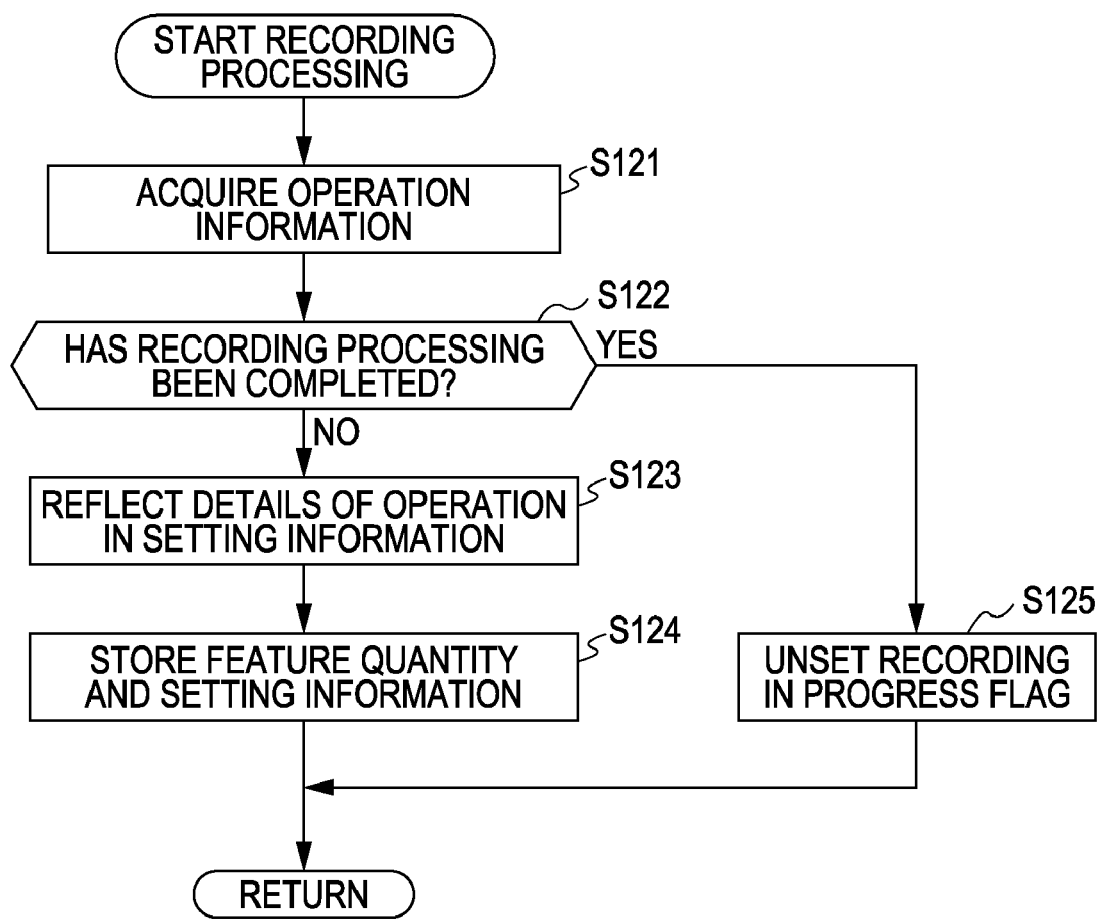
FIG. 17 is a flowchart describing recording processing.

An image processing method or a program according to an embodiment of the present invention includes the steps of: extracting a feature quantity from an image (for example, step S83 shown in FIG. 16); setting information including a plurality of setting items used to perform processing upon the image so that a designated setting item can be changed among the setting items (for example, step S123 shown in FIG. 17); and associating the setting information with a feature quantity of the image and recording them (for example, step S124 shown in FIG. 17).

Embodiments of the present invention will be described with reference to the accompanying drawings.

First, the concept of an image processing apparatus according to an embodiment of the present invention will be described with reference to FIGS. 1 and 2. An image processing apparatus according to an embodiment of the present invention performs processing designated by a user upon an image recorded in advance and displays the processed image. At that time, the image processing apparatus extracts a feature quantity of the image, and records information about details of the processing along with the extracted feature quantity. Furthermore, the image processing apparatus reads out the recorded information about details of the processing when reproducing the image recorded in advance, performs processing upon the image on the basis of the read information, and displays the processed image.

More specifically, an image processing apparatus 2 operates in two modes, an edit mode and a reproduction mode.

Figure 1:
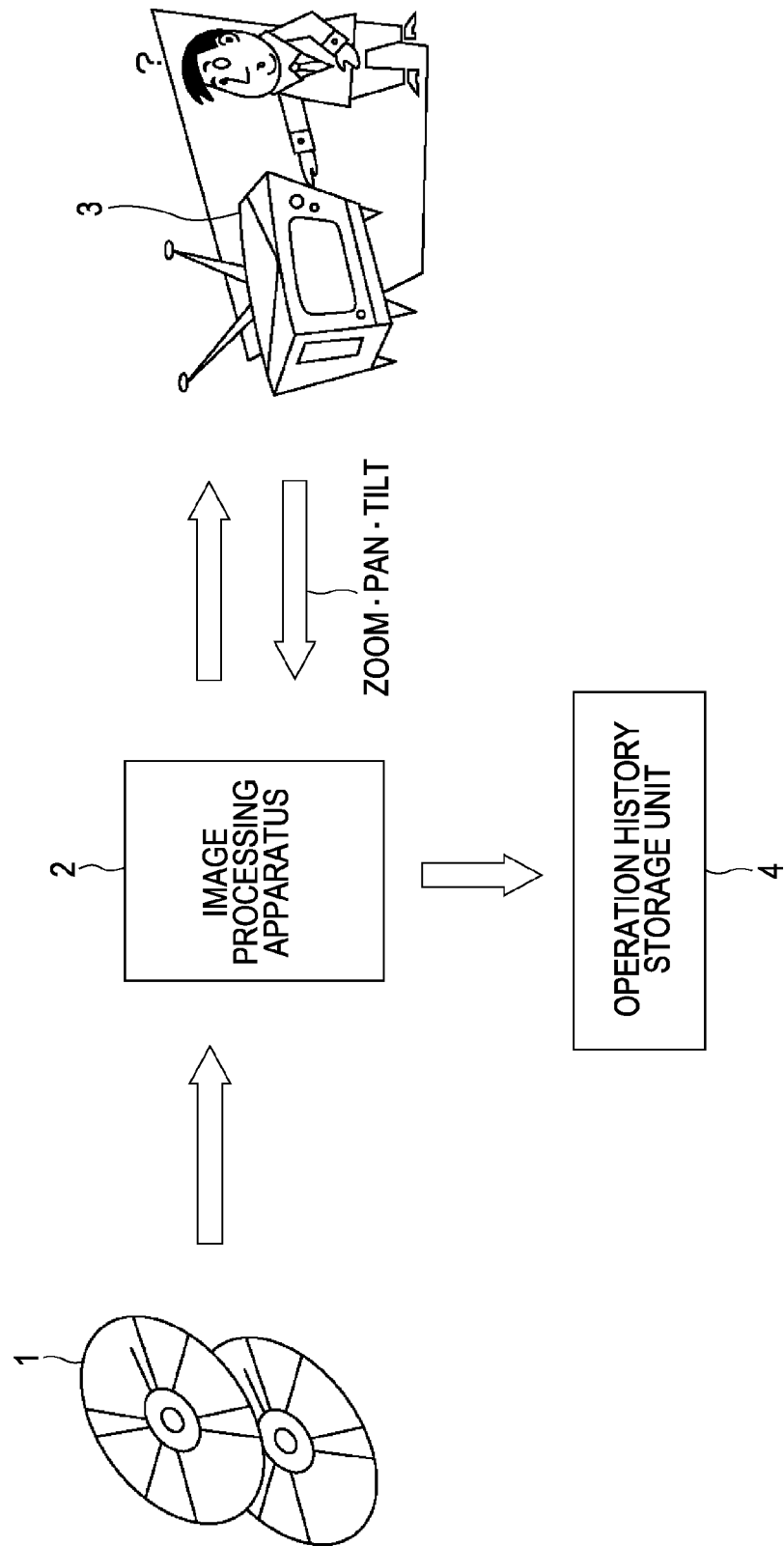
FIG. 1 is a diagram describing a concept of an image processing apparatus according to an embodiment of the present invention.

In the edit mode, as shown in FIG. 1, the image processing apparatus 2 displays on a display unit 3 an image reproduced from a recording medium 1 such as a DVD (Digital Versatile Disc) that records content including a moving image in advance by means of, for example, a DVD player. In this state, if a user provides an instruction for desired processing such as zoom, pan, or tilt control to be performed upon the image by operating a remote controller or the like, the image processing apparatus 2 generates setting information on the basis of details of the user's operation of the remote controller, performs processing corresponding to the setting information upon the image, and displays the processed image on the display unit 3. Furthermore, the image processing apparatus 2 extracts a feature quantity from the image, and records the setting information along with the extracted feature quantity in an operation history storage unit 4.

Figure 2:
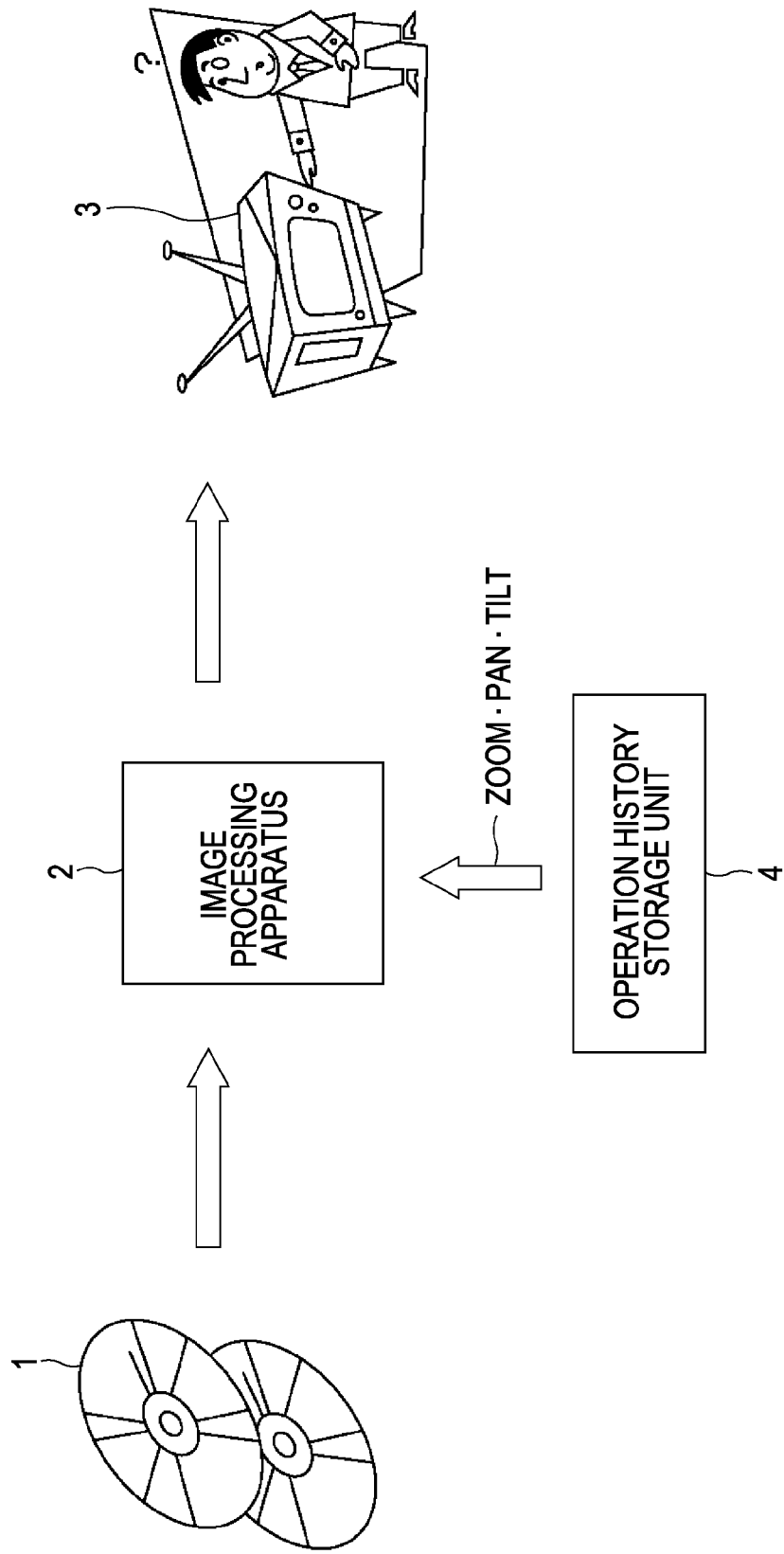
FIG. 2 is a diagram describing a concept of an image processing apparatus according to an embodiment of the present invention.

Next, in the reproduction mode, as shown in FIG. 2, the image processing apparatus 2 reads out an image reproduced from the recording medium 1 that records content including a moving image in advance by means of, for example, a DVD player, and extracts a feature quantity of the read image. At that time, the image processing apparatus 2 reads out setting information recorded in the operation history storage unit 4 along with the feature quantity in synchronization with the extraction of the feature quantity of the image read out from the recording medium 1, performs processing upon the image on the basis of the read setting information, and displays the processed image on the display unit 3.

Thus, the image processing apparatus 2 records only information about details of the processing performed on the image recorded in advance, whereby the processed image can be repeatedly reproduced even though the processed image is not recorded. Accordingly, even if the "copy once" rule, which restricts the number of recordings, is adopted for an image recorded in advance, various image processing operations can be repeatedly performed upon the image.

The image processing apparatus 2 described with reference to FIGS. 1 and 2 will be described in detail in the following.

FIG. 3 is a diagram showing a configuration of an image processing apparatus 13 according to an embodiment of the present invention which corresponds to the image processing apparatus 2 shown in FIGS. 1 and 2.

In a recording medium 11 corresponding to the recording medium 1 shown in FIGS. 1 and 2, image data encoded in a predetermined format is recorded in advance. An image reproduction unit 12 decodes the recorded image data, and sequentially supplies images obtained by the decoding to the feature quantity extraction section 41 and a delay section 47.

The feature quantity extraction section 41 extracts feature quantities of the images sequentially transmitted from the image reproduction unit 12, and supplies the extracted feature quantities to the synchronization detection section 42 and a feature quantity setting information recording unit 61 included in a storage block 43. A configuration of the feature quantity extraction section 41 will be described later in detail with reference to FIG. 4.

A remote controller 14 is configured with keys or buttons. As shown in FIGS. 1 and 2, a user operates the remote controller 14 when providing an instruction for desired processing to be performed on an image. The remote controller 14 generates an operation signal in accordance with the user's operation, generates a light-emitting pattern of light such as infrared on the basis of the generated operation signal, and emits light towards a light-receiving section 44 included in the image processing apparatus 13.

The light-receiving section 44 converts the light emitted by the remote controller 14 into the operation signal of the remote controller 14 on the basis of the light-emitting pattern of the light, and supplies the converted operation signal to an operation information recognition section 45. The operation information recognition section 45 recognizes operation information corresponding to the user's desired processing to be performed on the image on the basis of the operation signal transmitted from the light-receiving section 44, supplies an operation signal that is the recognition result to the setting information determination section 46. The operating state of the storage block 43 is controlled in accordance with the operation information transmitted from the remote controller 14. Accordingly, when the operation information recognition section 45 recognizes the operation information in accordance with which the storage block 43 is placed in its active or inactive state, the operation information recognition section 45 controls the storage block 43 so as to place it in its active or inactive state.

The setting information determination section 46 determines setting information used to instruct the reflection section 48 (described later) to perform processing upon the image on the basis of the operation information transmitted from the operation information recognition section 45, and supplies the determined setting information to the feature quantity setting information recording unit 61 and the reflection section 48.

The setting information includes a plurality of setting items representing details of processing to be performed on the image. That is, the setting information includes a plurality of setting items such as a zoom factor, a zoom center point, and a brightness level. In addition, setting items such as contrast, gamma correction, a DRC (Digital Reality Creation) palette value (a resolution setting value and a noise setting value), a sound volume, and speech switching (switching of the language used) may be set.

If the setting information determination section 46 receives setting information from the feature quantity setting information read unit 63, the setting information determination section 46 supplies the received setting information to the reflection section 48.

The feature quantity setting information recording unit 61 included in the storage block 43 stores the feature quantity transmitted from the feature quantity extraction section 41 along with the setting information transmitted from the setting information determination section 46 in the feature quantity setting information storage unit 62 (corresponding to the operation history storage unit 4 shown in FIGS. 1 and 2).

The synchronization detection section 42 retrieves the same feature quantity as a feature quantity transmitted from the feature quantity extraction section 41, which is a feature quantity of the image being reproduced by the image reproduction unit 12 (reproduction position feature quantity described later), among feature quantities stored in the feature quantity setting information storage unit 62 (retrieval position feature quantity described later). If the same feature quantity is detected, the synchronization detection section 42 supplies the retrieval result to the feature quantity setting information read unit 63 as a synchronous position of the image. A configuration of the synchronization detection section 42 will be described in detail later with reference to FIG. 6.

Upon receiving the feature quantity (the retrieval position feature quantity) detected as the synchronous position from the synchronization detection section 42, the feature quantity setting information read unit 63 reads out setting information stored along with the detected feature quantity in the feature quantity setting information storage unit 62, and supplies the read setting information to the setting information determination section 46.

The delay section 47 temporarily stores the image transmitted from the image reproduction unit 12 for a delay time corresponding to processing performed by the feature quantity extraction section 41, the synchronization detection section 42, the storage block 43, and the setting information determination section 46, and then outputs the image to the reflection section 48 after the delay time has elapsed. If the setting information is transmitted from the setting information determination section 46 to the reflection section 48, the reflection section 48 reflects processing corresponding to the received setting information in the image transmitted from the delay section 47, and displays the processed image on a display unit 15. If the setting information is not transmitted from the setting information determination section 46 to the reflection section 48, the reflection section 48 displays the image transmitted from the delay section 47 on the display unit 15 without processing it.

Figure 4:
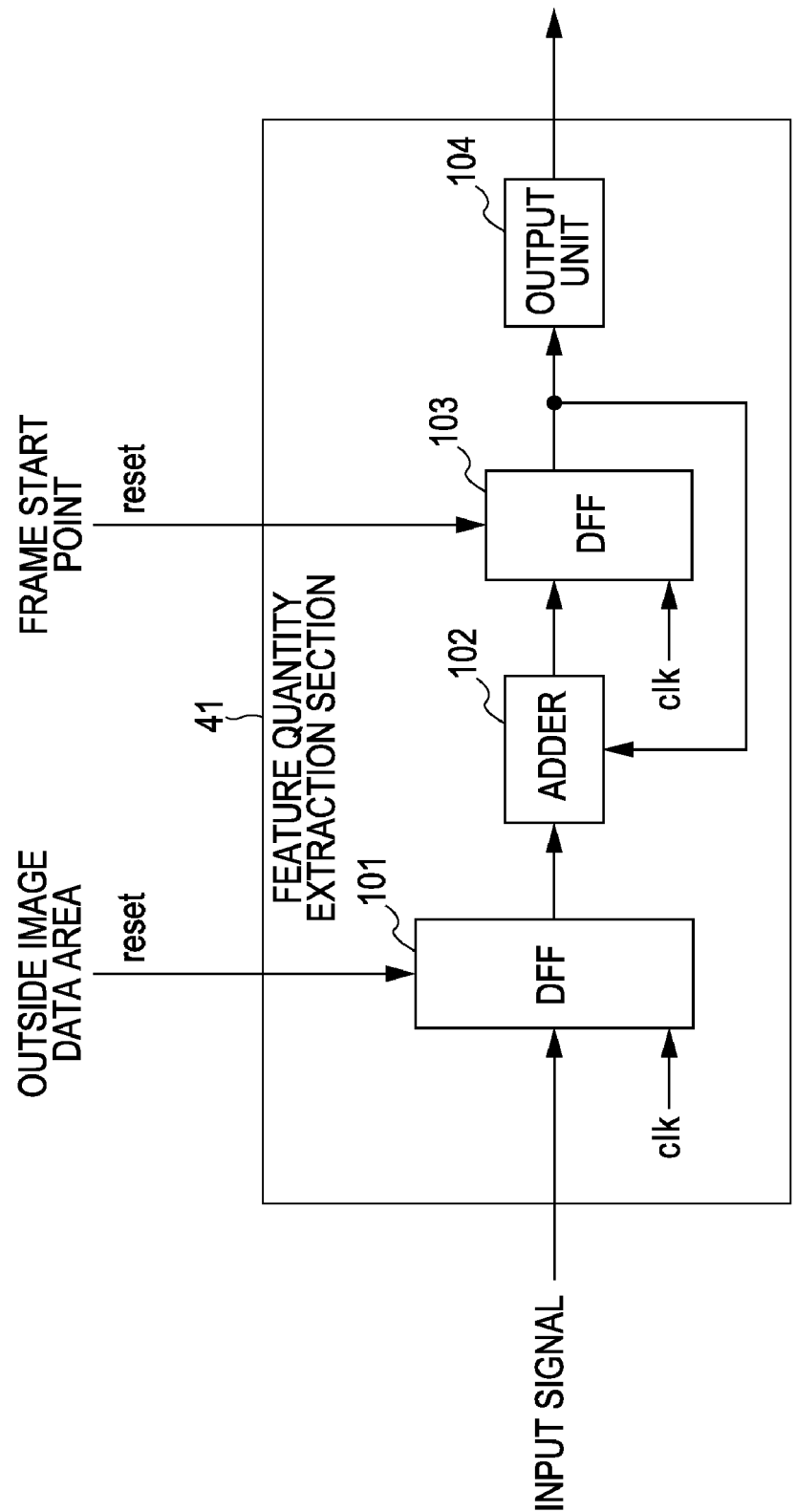
FIG. 4 is a block diagram showing a configuration of a feature quantity extraction section.

A detailed configuration of the feature quantity extraction section 41 will be described with reference to FIG. 4.

Figure 5:
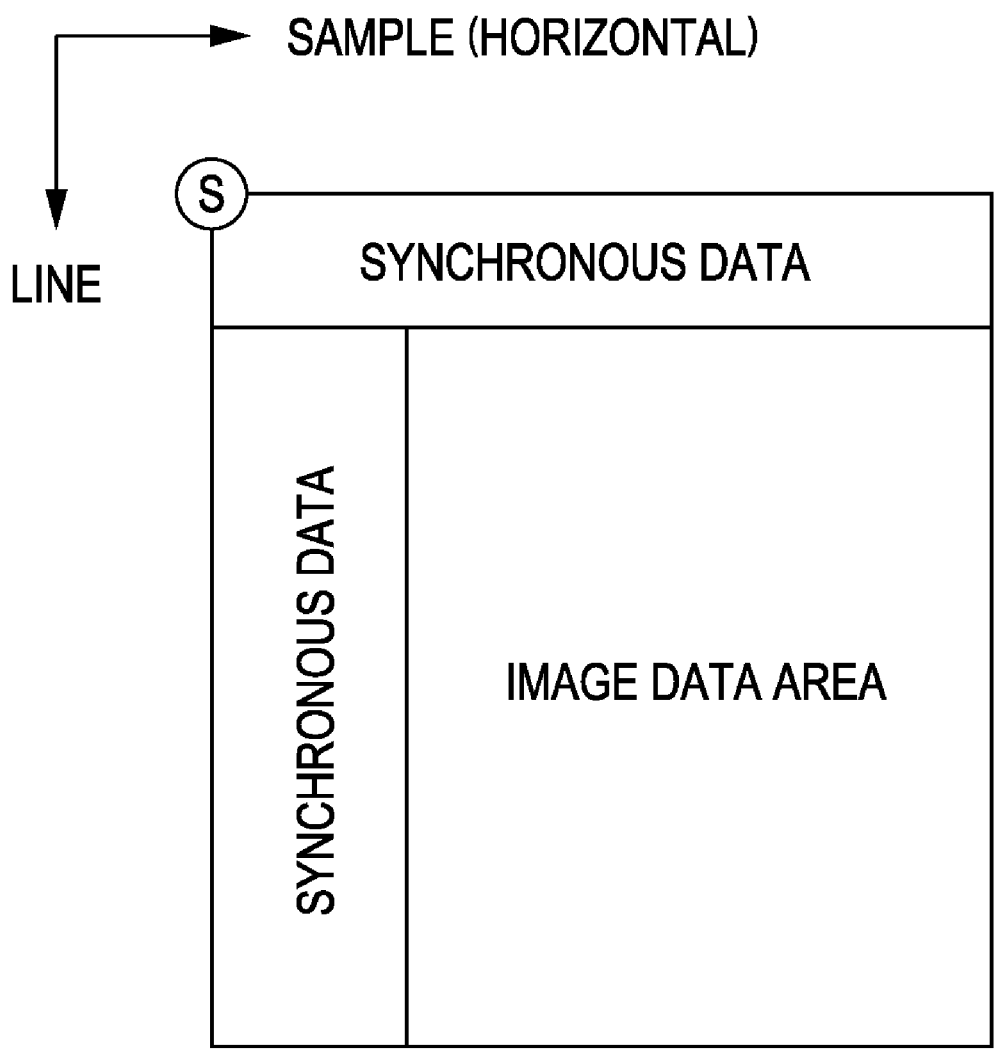
FIG. 5 is a diagram showing an exemplary configuration of image signals.

A DFF (D-type flip-flop) 101 stores an input signal received just before, and outputs the input signal to an adder 102 at a time when a clock signal (clk) is input thereinto from a clock signal generator (not shown). If the input signal is an image signal representing an area outside an image data area, a reset signal is input into the DFF 101 so as to erase the input signal. That is, image data of an image is composed of a synchronous data area and the image data area as shown in FIG. 5, and image signals configuring the image individually correspond to one of the areas. A plurality of pieces of position information about positions in the image data are sequentially input from a frame start point S that is an encircled intersection point (origin) of a sample axis in the horizontal direction and a line axis in the vertical direction in FIG. 5. If a piece of received position information is synchronous data in the synchronous data area outside the image data area, a reset signal is input into the DFF 101. Consequently, a signal representing the synchronous data is not input into the adder 102. That is, among the input image signals configuring the image, the DFF 101 supplies only input image signals representing data in the image data area to the adder 102 in synchronization with a clock signal.

The adder 102 adds the signal transmitted from the DFF 101 and a signal transmitted from a DFF 103, and the added signal to the DFF 103. More specifically, the adder 102 extracts low-order 8 bits from the sum of the signals transmitted from the DFFs 101 and 103, and supplies a signal representing the extracted value to the DFF 103.

The DFF 103 supplies the signal transmitted from the adder 102 to the adder 102 and an output unit 104 at a time when a clock signal (clk) is input thereinto from a clock signal generator (not shown). Furthermore, when a signal representing the frame start point S (the encircled origin that is the intersection point of the sample axis in the horizontal direction and the line axis in the vertical direction in FIG. 5) is input into the DFF 103, a reset signal is input into the DFF 103 so as to erase the input signal representing the frame start point S. That is, the DFF 103 supplies to the output unit 104 a value which the adder 102 obtained by accumulating only the signals representing data in the image data area among the input image signals configuring the image.

The output unit 104 receives the value of one frame (or one field) from the DFF 103, and outputs the value as a feature quantity of a one-frame (or one-field) image. That is, the output unit 104 outputs the low-order 8 bits of the value which the adder 102 obtained by accumulating only the signals representing data in the image data area as a feature quantity of the frame (or field). Here, any information capable of being used to recognize an image on a frame-by-frame basis can be used as the feature quantity. Accordingly, the feature quantity is not limited to the low-order 8 bits of the value obtained by accumulating only the signals (pixel values) representing data in the image data area, and may be, for example, the sum of pixel values of only pixels included in a predetermined area around the center of the image data area.

Figure 6:
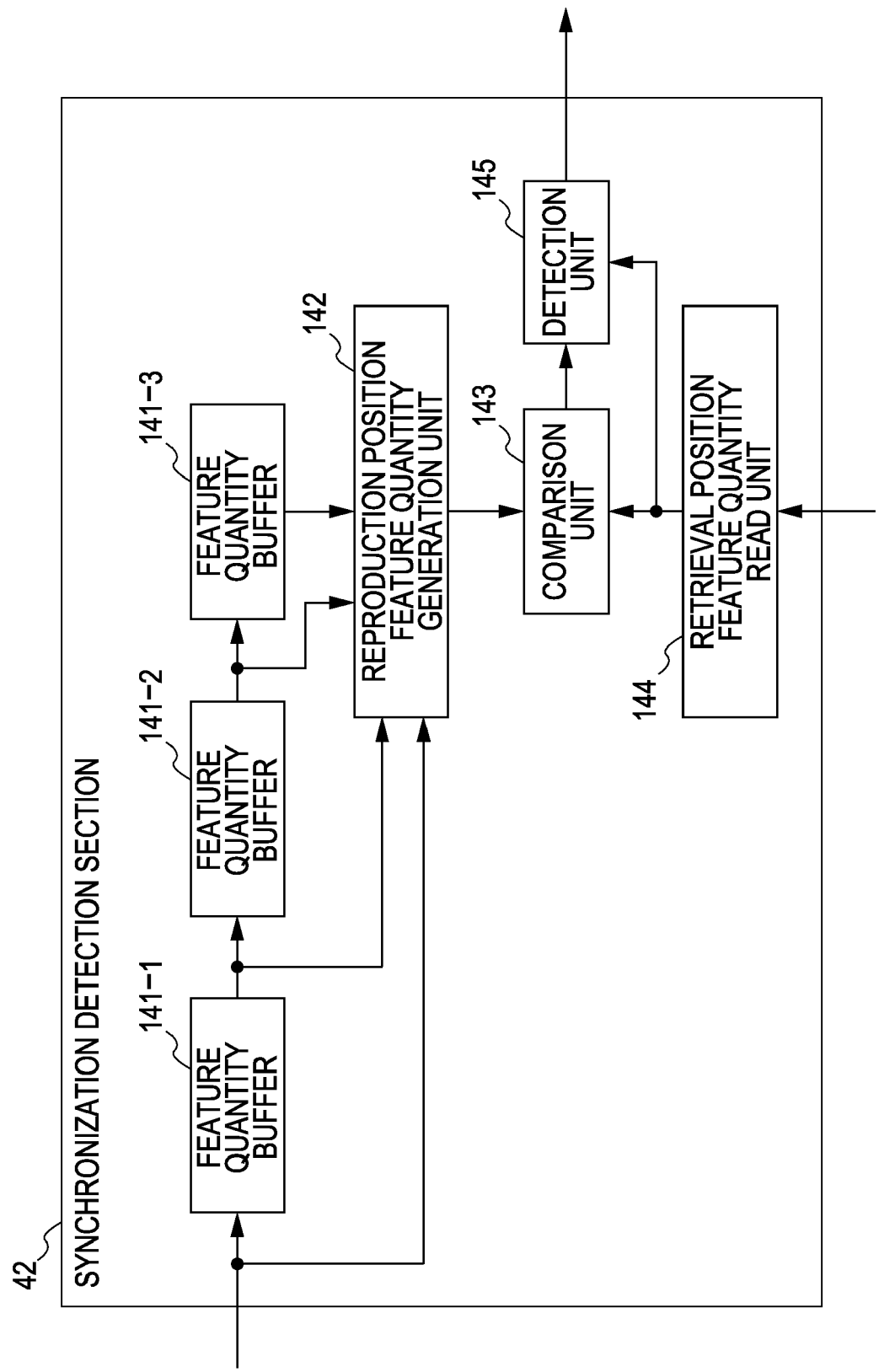
FIG. 6 is a block diagram showing a configuration of a synchronization detection section.

Next, a detailed configuration of the synchronization detection section 42 will be described with reference to FIG. 6.

Feature quantity buffers 141-1 to 141-3 receive a transmitted feature quantity, temporarily store it, and then transmit a previously stored feature quantity to a reproduction position feature quantity generation unit 142 and a subsequent stage. More specifically, the feature quantity buffer 141-1 outputs a previously stored feature quantity to the reproduction position feature quantity generation unit 142 and the feature quantity buffer 141-2 at a subsequent stage. Similarly, the feature quantity buffer 141-2 outputs a previously stored feature quantity to the reproduction position feature quantity generation unit 142 and the feature quantity buffer 141-3 at a subsequent stage. The feature quantity buffer 141-3 outputs a previously stored feature quantity to only the reproduction position feature quantity generation unit 142. The reproduction position feature quantity generation unit 142 sequentially acquires the feature quantities of the past three frames transmitted from the feature quantity buffers 141-1 to 141-3 and the latest feature quantity, generates reproduction position information (a reproduction position feature quantity) using them, and outputs the generated information to the comparison unit 143. That is, the reproduction position feature quantity generation unit 142 generates the reproduction position feature quantity using a total of four feature quantities, that is, the feature quantity of the latest frame and the feature quantities of the past three frames, as a feature quantity used to specify a reproduction position.

A retrieval position feature quantity read unit 144 sequentially reads out four successive feature quantities stored in the feature quantity setting information storage unit 62 at a time, and supplies the read feature quantities to the comparison unit 143 and a detection unit 145 as a retrieval position feature quantity. The comparison unit 143 compares the reproduction position feature quantity transmitted from the reproduction position feature quantity generation unit 142 with the feature quantities (the retrieval position feature quantity) sequentially transmitted from the retrieval position feature quantity read unit 144. If a retrieval feature quantity that matches the reproduction position feature quantity is retrieved, the comparison unit 143 determines that synchronization between them has been detected, and notifies the detection unit 145 about the fact. The detection unit 145 outputs the retrieval position feature quantity transmitted from the retrieval position feature quantity read unit 144 at a time when the comparison unit 143 determines that synchronization between them has been detected as a synchronization detection result.

Figure 7:
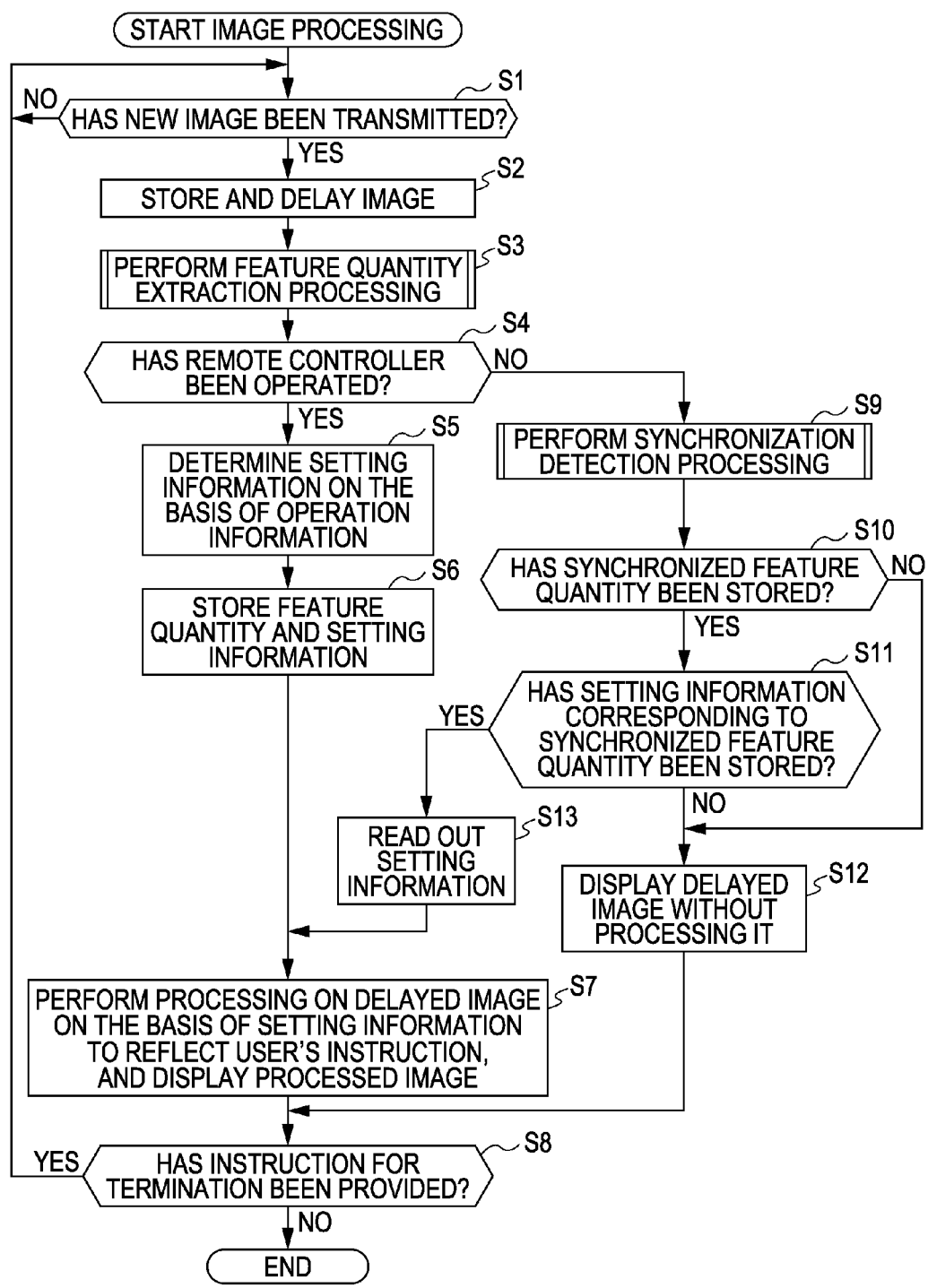
FIG. 7 is a flowchart describing image processing.

Next, image processing performed by the image processing apparatus 13 shown in FIG. 3 will be described with reference to a flowchart shown in FIG. 7. In the following description, it is assumed that the storage block 43 is placed in its active state.

In step S1, the delay section 47 determines whether a new image has been transmitted from the image reproduction unit 12. If it is determined that a new image has not yet been transmitted, the delay section 47 repeatedly performs the processing of step S1.

For example, if the image reproduction unit 12 reads out an image recorded on the recording medium 11 and supplies the read image to the delay section 47 and the delay section 47 determines that a new image has been transmitted from the image reproduction unit 12, in step S2, the delay section 47 temporarily stores one frame of the transmitted image so as to delay it. In the following, description will be made under the assumption that an image is processed on a frame-by-frame basis. However, an image may be processed, for example, on a field-by-field basis instead of a frame-by-frame basis.

In step S3, the feature quantity extraction section 41 performs feature quantity extraction processing so as to extract a feature quantity from one frame of the image transmitted from the image reproduction unit 12. That is, when the delay section 47 temporarily stores a new one-frame image so as to delay it, the new one-frame image is also supplied to the feature quantity extraction section 41. At the same time, the same image is temporarily stored for delay processing and is subjected to the feature quantity extraction processing.

Figure 8:
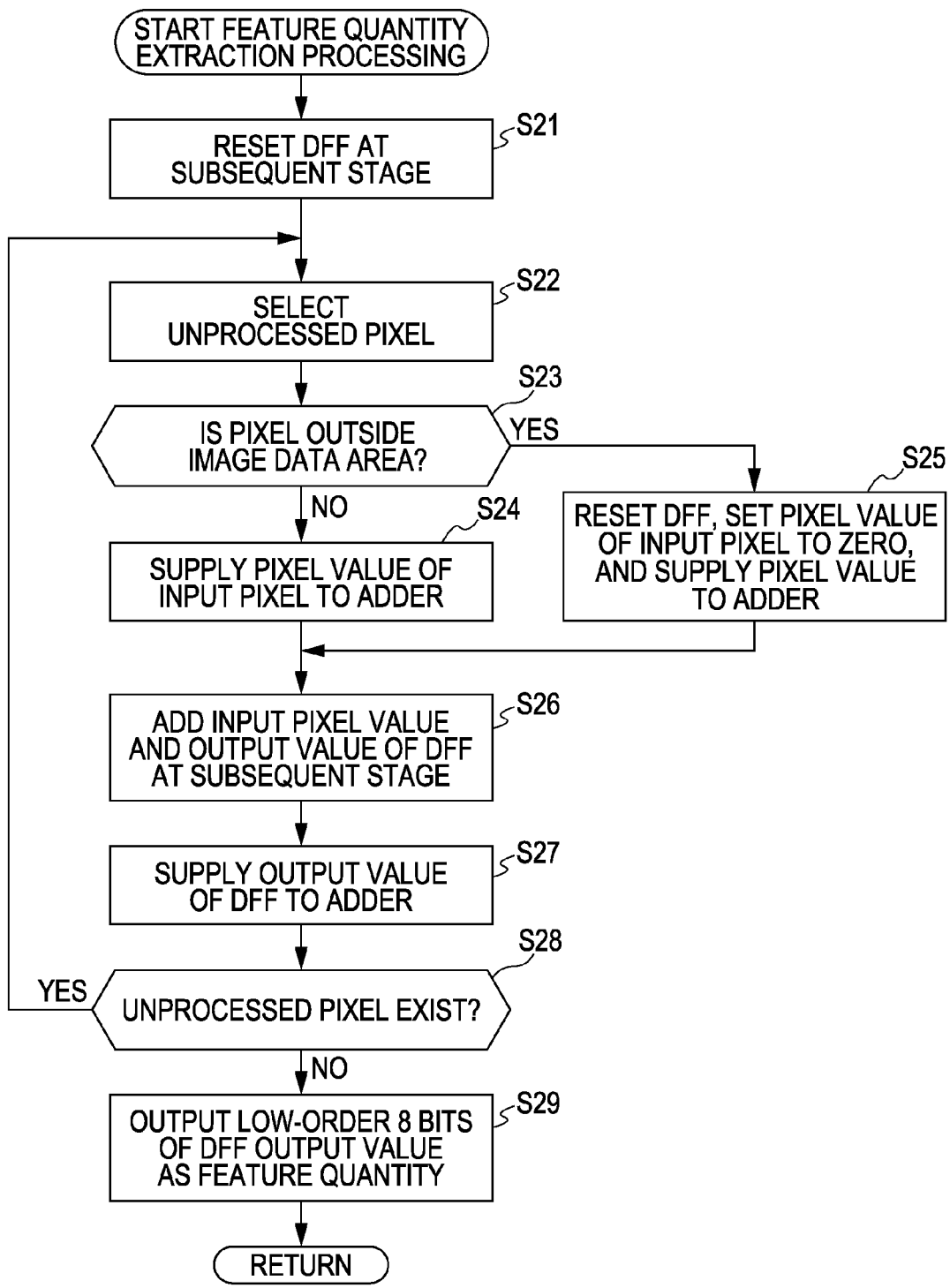
FIG. 8 is a flowchart describing feature quantity extraction processing.

Here, the feature quantity extraction processing will be described with reference to FIG. 8.

In step S21, the DFF 103 is reset at the frame start point S (shown in FIG. 5).

In step S22, an unprocessed pixel is selected. In step S23, it is determined whether the selected pixel is outside the image data area. More specifically, for example, unprocessed pixels are sequentially read out from the one-frame image in accordance with the raster scan order so as to determine whether each of the read pixels is outside the image data area.

As shown in FIG. 5, in the case of the first pixel (a pixel at the frame start point S), the pixel is in the synchronous data area and is therefore outside the image data area. Accordingly, in step S25, the DFF 101 is reset, and a pixel value of zero is output from the DFF 101. On the other hand, for example, if a pixel to be processed selected in accordance with the raster scan order is in the image data area, in step S24, the DFF 101 supplies a pixel value of the selected pixel to the adder 102 in synchronization with a generated clock signal.

In step S26, the adder 102 adds the received pixel value and a value of a signal transmitted from the DFF 103, and supplies a result of addition to the DFF 103.

In step S27, the DFF 103 returns low-order 8 bits of the result of addition transmitted from the adder 102 to the adder 102 in synchronization with a generated clock signal. At that time, the DFF 103 also supplies the result of addition to the output unit 104. However, the output unit 104 does not output the result of addition.

In step S28, it is determined whether unprocessed pixels exist. If unprocessed pixels exist, the process returns to step S22. That is, the process from step S22 to step S28 is repeated until all pixels included in the one-frame image have been processed. If it is determined that all the pixels included in the one-frame image have been already processed, in step S29, the output unit 104 outputs the result of addition transmitted from the DFF 103, that is, low-order 8 bits of accumulated pixel values of pixels in the image data area, as a feature quantity of the one-frame image.

By performing the above-described process, the low-order 8 bits of accumulated pixel values of all pixels in the image data area are extracted from the image signals configuring the one-frame image as a feature quantity of the frame.

Here, description will be made with reference back to the flowchart shown in FIG. 7.

In step S4, the operation information recognition section 45 determines whether a user has provided an instruction for image processing by operating the remote controller 14. For example, if the user provided an instruction for zoom processing with a zoom factor of 2 while seeing an image displayed on the display unit 15, the light-receiving section 44 receives a light-emitting pattern from the remote controller 14, and supplies a signal based on the received light-emitting pattern to the operation information recognition section 45. Upon receiving the signal from the light-receiving section 44, the operation information recognition section 45 determines that the remote controller 14 has been operated. Subsequently, the process proceeds to step S5.

In step S5, the operation information recognition section 45 recognizes operation information of the remote controller 14 on the basis of the signal transmitted from the light-receiving section 44, and supplies the recognition result to the setting information determination section 46. The setting information determination section 46 determines setting information used to instruct the reflection section 48 to perform processing upon the image on the basis of the received operation information, and supplies the setting information to the feature quantity setting information recording unit 61 and the reflection section 48. That is, in this case, the user has provided the instruction for zoom processing with a zoom factor of 2. Accordingly, setting information is set so that a setting item included therein used to instruct the reflection section 48 to perform the zoom processing with the zoom factor of 2 upon the image can be changed, and is then supplied to the feature quantity setting information recording unit 61 to the reflection section 48.

Figure 9:
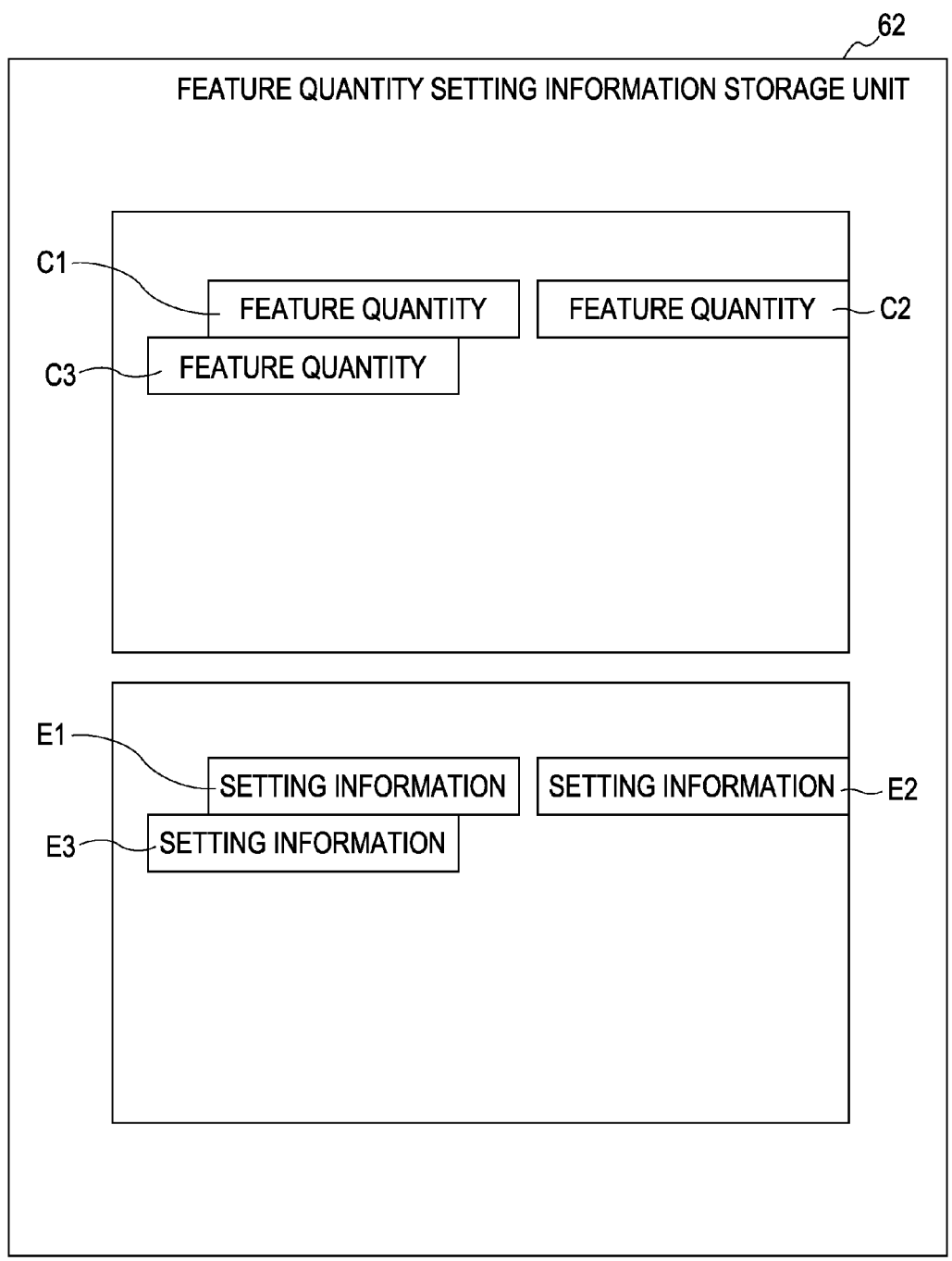
FIG. 9 is a diagram describing feature quantity extraction processing.

In step S6, the feature quantity setting information recording unit 61 records the feature quantity transmitted from the feature quantity extraction section 41 along with the setting information transmitted from the setting information determination section 46 in the feature quantity setting information storage unit 62. Consequently, the feature quantity and the setting information are associated with each other and are then stored. More specifically, as shown in FIG. 9, if a feature quantity C1 is recorded at a predetermined address A, setting information E1 associated with the feature quantity C1 is recorded at an address obtained by multiplying the address A by m, that is, an address m×A. In FIG. 9, addresses in the feature quantity setting information storage unit 62 at which feature quantities and setting information are recorded are shown.

Subsequently, the feature quantity setting information recording unit 61 similarly records a feature quantity C2 at an address B and records setting information E2 corresponding to the feature quantity C2 at an address m×B. Furthermore, the feature quantity setting information recording unit 61 records a feature quantity C3 at an address C and records setting information E3 corresponding to the feature quantity C3 at an address m×C. Thus, setting information is associated with a feature quantity and is then recorded along with the feature quantity. Accordingly, if a feature quantity is determined, an address of setting information corresponding to the feature quantity can be specified using the address of the feature quantity. Consequently, setting information corresponding to a desired feature quantity can be easily retrieved in the feature quantity setting information storage unit 62. In a designated period for which the same processing is continuously performed, feature quantities and pieces of setting information are continuously recorded. That is, the feature quantities C1 to C3 are not feature quantities of one frame. Feature quantities of the number of frames processed in the designated period are continuously recorded. Similarly, these pieces of setting information E1 to E3 at addresses linked to the addresses of the feature quantities C1 to C3 shown in FIG. 9 do not correspond to the feature quantities of one frame. A plurality of pieces of setting information corresponding to the number of frames processed in the designated period are continuously recorded.

In step S7, the reflection section 48 performs processing upon the image stored in the delay section 47 on the basis of the setting information transmitted from the setting information determination section 46, whereby processing corresponding to the user's instruction is reflected in the image. Subsequently the reflection section 48 displays the processed image on the display unit 15.

In step S8, the operation information recognition section 45 determines whether an instruction for terminating the operation has been provided. If it is determined that the instruction for terminating the operation has been provided, the process ends. On the other hand, if it is determined that the instruction for terminating the operation has not yet been provided, the process returns to step S1.

That is, as long as the user continues to provide instructions for processing to be performed on an image by operating the remote controller 14, the process from step S1 to step S8 is repeated. Consequently, a plurality of pieces of setting information indicating details of processing are stored in the feature quantity setting information storage unit 62 along with corresponding feature quantities. This repeatedly performed process from step S1 to S8 corresponds to the processing performed in the edit mode described previously with reference to FIGS. 1 and 2.

On the other hand, in step S4, if it is determined that the remote controller 14 has not been operated, the process proceeds to step S9. In step S9, the synchronization detection section 42 performs synchronization detection processing so as to detect synchronization between the feature quantity of the image being reproduced and a feature quantity associated with setting information used to process the image.

Here, the synchronization detection processing will be described with reference to a flowchart shown in FIG. 10.

In step S41, the reproduction position feature quantity generation unit 142 included in the synchronization detection section 42 determines whether a feature quantity has been transmitted from the feature quantity extraction section 41. If it is determined that the feature quantity has not yet been transmitted, the processing of step S41 is repeated until a feature quantity is transmitted. For example, if the feature quantity is extracted in the feature quantity extraction processing performed in step S3 and the feature quantity of the image being reproduced is transmitted from the feature quantity extraction section 41, the process proceeds to step S42.

In step S42, the retrieval position feature quantity read unit 144 initializes a counter i used to count feature quantities at a retrieval position by setting it at zero.

In step S43, the reproduction position feature quantity generation unit 142 receives the feature quantity transmitted from the feature quantity extraction section 41 and also receives the feature quantities that have been stored in the feature quantity buffers 141-1 to 141-3. That is, upon receiving a new feature quantity, the feature quantity buffer 141-1 supplies the previously stored feature quantity to the reproduction position feature quantity generation unit 142 and the feature quantity buffer 141-2. Similarly, the feature quantity buffer 141-2 stores the feature quantity transmitted from the feature quantity buffer 141-1, and supplies the previously stored feature quantity to the reproduction position feature quantity generation unit 142 and the feature quantity buffer 141-3. Furthermore, the feature quantity buffer 141-3 stores the feature quantity transmitted from the reproduction position feature quantity generation unit 142-2, and supplies the previously stored feature quantity to the reproduction position feature quantity generation unit 142. Consequently, the reproduction position feature quantity generation unit 142 receives the feature quantity of the latest frame and the feature quantities of the past three frames that are individually stored in the feature quantity buffers 141-1, 141-2, and 141-3. The reproduction position feature quantity generation unit 142 supplies the feature quantities of the above-described four frames including the frame being reproduced to the comparison unit 143 as a reproduction position feature quantity.

In step S44, the retrieval position feature quantity read unit 144 reads out feature quantities of four consecutive frames starting from the ith frame counted from a position at which the last feature quantity has been stored as a retrieval position feature quantity, and supplies the retrieval position feature quantity to the comparison unit 143 and the detection unit 145.

In step S45, the comparison unit 143 compares the reproduction position feature quantity transmitted from the reproduction position feature quantity generation unit 142 with the retrieval position feature quantity transmitted from the retrieval position feature quantity read unit 144. The reproduction position feature quantity is composed of the feature quantities of a total four frames, that is, the frame being reproduced and the past three frames. The retrieval position feature quantity is composed of the feature quantities of four consecutive frames starting from the ith frame counted from a position at which the last feature quantity has been stored in the feature quantity setting information storage unit 62, that is, the ith feature quantity to the (i−3)th feature quantity counted from the position at which the last feature quantity has been stored.

In step S46, the comparison unit 143 determines whether the reproduction position feature quantity and the retrieval position feature quantity match on the basis of the comparison result. If it is determined in step S46 that they do not match, in step S48, the retrieval position feature quantity read unit 144 determines whether the reproduction position feature quantity has been compared with all feature quantities stored in the feature quantity setting information storage unit 62. For example, if it is determined in step S48 that the reproduction position feature quantity has not yet been compared with all feature quantities, in step S49, the retrieval position feature quantity read unit 144 increments the counter i by one. Subsequently, the process returns to step S44. That is, if the reproduction position feature quantity does not match the retrieval position feature quantity, the process from step S44 to step 46, step S48, and step S49 is repeated until the reproduction position feature quantity has been compared with all the stored feature quantities. The comparison of the reproduction position feature quantity and the retrieval position feature quantity is repeatedly performed, both of which are composed of feature quantities of four consecutive frames, while shifting the retrieval position feature quantity by one frame.

Figure 11:
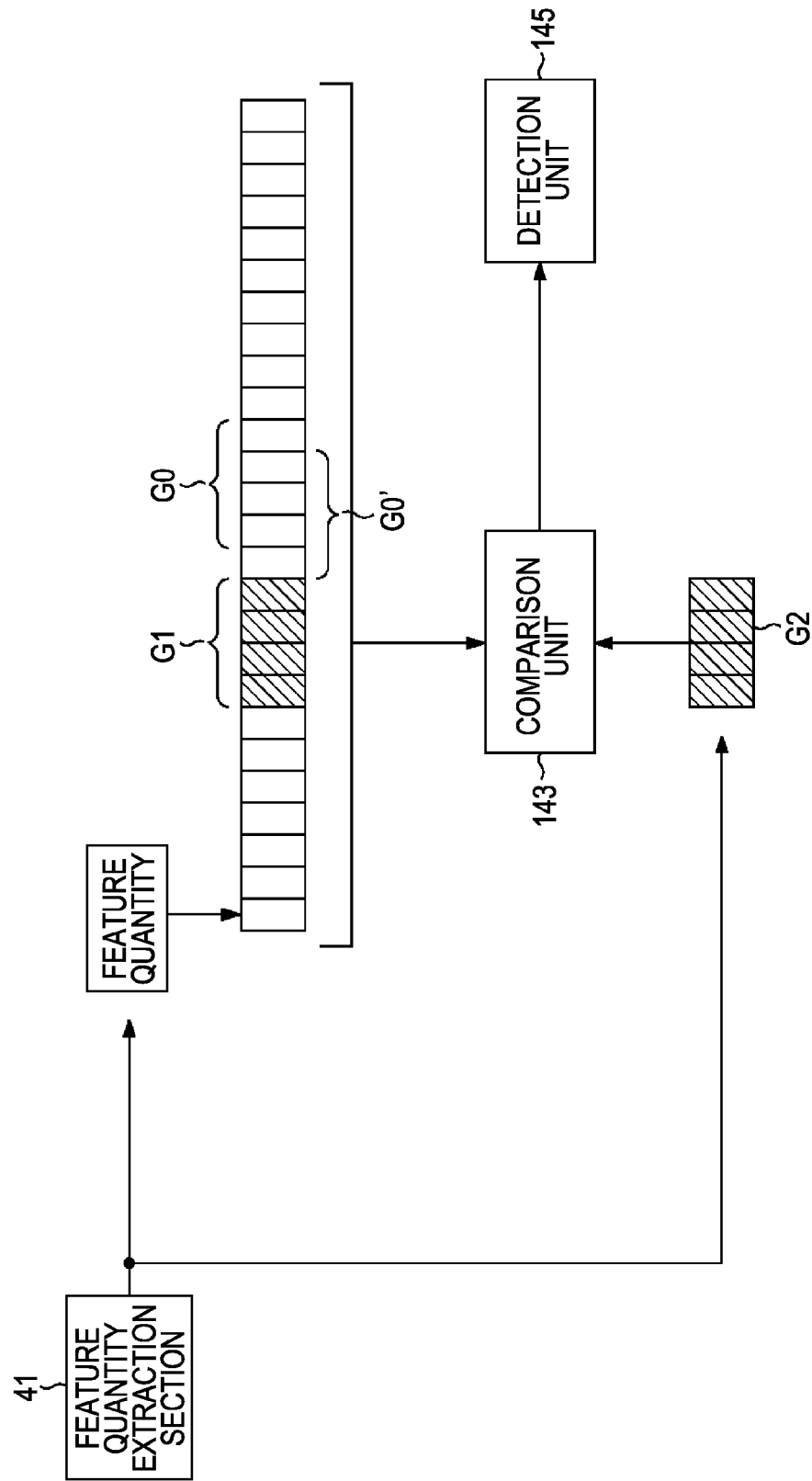
FIG. 11 is a diagram describing synchronization detection processing.

That is, for example, as shown in the upper right portion in FIG. 11, in this case, the retrieval position feature quantity is a block of four consecutive feature quantities among feature quantities that have been sequentially stored by the feature quantity extraction section 41. Here, in FIG. 11, each of the vertically oriented rectangular boxes denotes a feature quantity of one frame. A vertically oriented rectangular box at the left end denotes a feature quantity stored at the leading position in the feature quantity setting information storage unit 62. A vertically oriented rectangular box at the right end denotes a feature quantity stored at the last position in the feature quantity setting information storage unit 62, that is, the last stored feature quantity.

Diagonally shaded portions G1 and G2 indicate that the same consecutive feature quantities are arranged. Here, as shown in the lower right portion in FIG. 11, the reproduction position feature quantity is a block of feature quantities of four consecutive frames including the feature quantity of a frame being reproduced which has been transmitted from the feature quantity extraction section 41.

For example, it is assumed that the reproduction position feature quantity is the diagonally shaded portion G2 shown in FIG. 11. If the reproduction position feature quantity G2 is compared with a retrieval position feature quantity G0, a synchronous position is not detected, because they are not the same. Furthermore, the reproduction position feature quantity G2 has not yet been compared with all feature quantities. Accordingly, the counter i is incremented by one, and the reproduction position feature quantity G2 is then compared with a retrieval position feature quantity G0'. Thus, the comparison of the reproduction position feature quantity G2 and the retrieval position feature quantity is repeatedly performed by shifting the retrieval position feature quantity by one frame from right to left in FIG. 11.

For example, if the reproduction position feature quantity G2 is compared with a retrieval position feature quantity G1 in step S46, it is determined that they match, because they are the same. Subsequently, in step S47, the comparison unit 143 notifies the detection unit 145 about the match. Upon receiving the notification, the detection unit 145 supplies a feature quantity at the leading position included in the present retrieval position feature quantity transmitted from the retrieval position feature quantity read unit 144, that is, an ith feature quantity counted from the last position at which the last feature quantity has been stored in the feature quantity setting information storage unit 62, to the feature quantity setting information read unit 63 as synchronous position information.

On the other hand, if it is determined in step S48 that the reproduction position feature quantity has already been compared with all the stored feature quantities, in step S50, the detection unit 145 outputs a signal indicating that a retrieval position feature quantity that matches the reproduction position feature quantity does not exist and synchronization between the reproduction position feature quantity and a retrieval position feature quantity is not achieved.

By performing the above-described process, synchronization between a feature quantity stored in the feature quantity setting information storage unit 62 and the feature quantity of the image being reproduced can be achieved. If a feature quantity of only a frame being reproduced is compared with a feature quantity stored in the feature quantity setting information storage unit 62, they sometimes eventually match and synchronization between them is therefore detected at an incorrect position. In order to reduce such a possibility, the synchronization detection section 42 compares not only the feature quantity of the frame being reproduced but also the feature quantities of the past three frames, that it, the feature quantities of the total of four frames including the frame being reproduced, with stored feature quantities, thereby more accurately performing synchronization detection. Furthermore, by using the feature quantities in the above-described manner, the feature quantities can serve as time codes for individual frames. Accordingly, synchronization detection can be performed on a frame-by-frame basis without using a time code.

Here, description will be made with reference back to the flowchart shown in FIG. 7.

In step S10, the feature quantity setting information read unit 63 determines whether feature quantities that match the reproduction position feature quantity of the frame being reproduced have been stored in the feature quantity setting information storage unit 62. That is, the feature quantity setting information read unit 63 determines whether feature quantities synchronized with the reproduction position feature quantity of the frame being reproduced have been stored in the feature quantity setting information storage unit 62. If it is determined in step S10 that feature quantities synchronized with the reproduction position feature quantity of the frame being reproduced have not been stored, the process proceeds to step S12.

Figure 10:
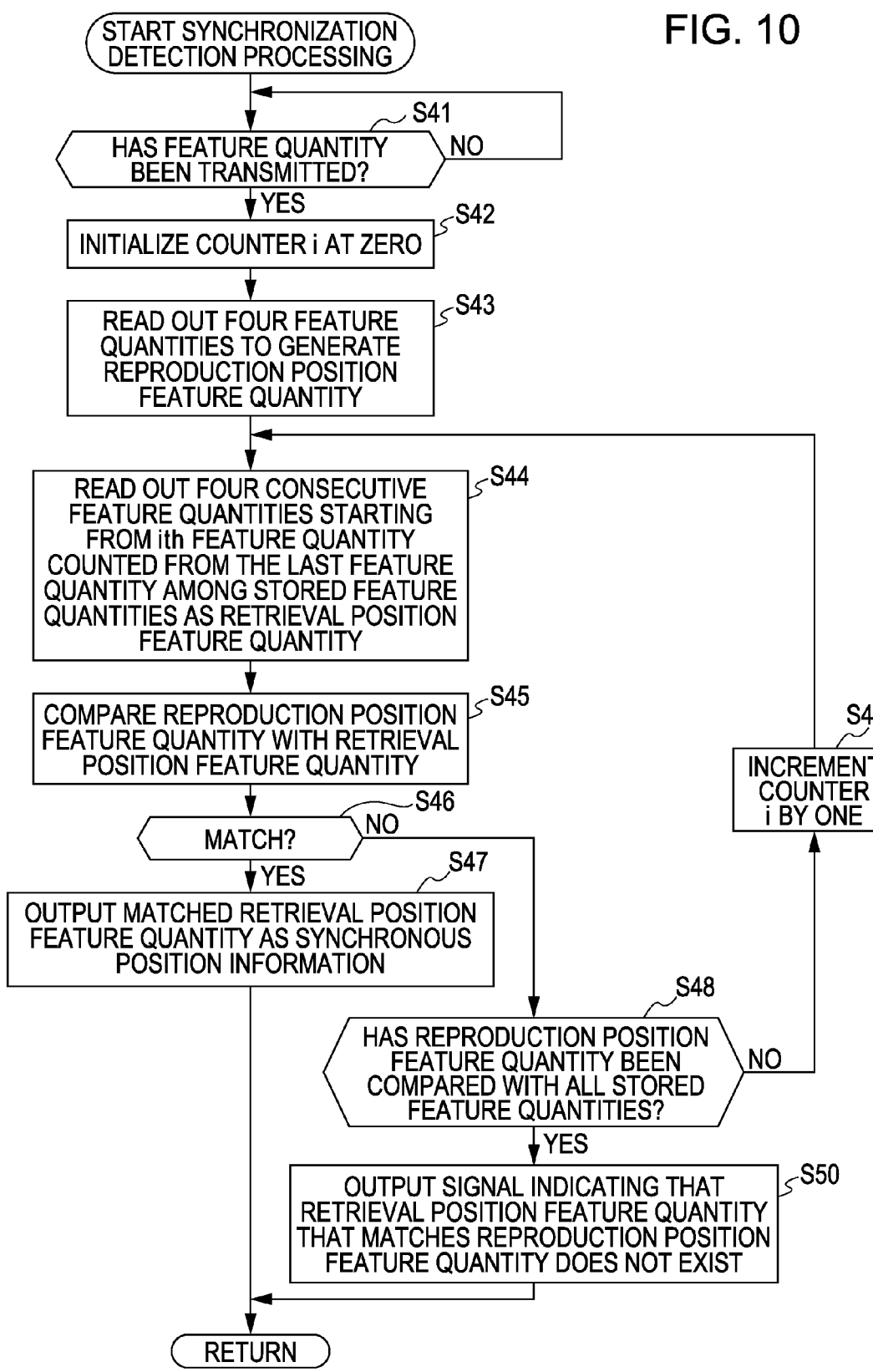
FIG. 10 is a flowchart describing synchronization detection processing.

For example, if the synchronous position information obtained in step S47 in the flowchart shown in FIG. 10 has been transmitted to the feature quantity setting information read unit 63, feature quantities that match the reproduction position feature quantity of the frame being reproduced have already been stored in the feature quantity setting information storage unit 62. In this case, the process proceeds to step S11.

In step S11, the feature quantity setting information read unit 63 determines whether setting information corresponding to the synchronized feature quantity has been stored in the feature quantity setting information storage unit 62. That is, since it is possible to store only a feature quantity along with no setting information in the feature quantity setting information storage unit 62, it is determined whether there is setting information corresponding to the synchronized feature quantity in this processing.

For example, if it is determined in step S11 that the setting information corresponding to the synchronized feature quantity has not been stored, or if it is determined in step S10 that the synchronized feature quantity has not been stored, in step S12, the feature quantity setting information read unit 63 supplies no setting information to the setting information determination section 46. Consequently, the setting information determination section 46 cannot receive setting information from the feature quantity setting information read unit 63. As the result, no setting information for specifying processing is transmitted to the reflection section 48. The reflection section 48 displays the one-frame image temporarily stored in the delay section 47 on the display unit 15 without processing it.

On the other hand, for example, if it is determined in step S11 that the setting information corresponding to the synchronized feature quantity has been stored, in step S13, the feature quantity setting information read unit 63 reads out the setting information corresponding to the feature quantity that is set as the synchronous position information from the feature quantity setting information storage unit 62, and supplies the read setting information to the setting information determination section 46. Subsequently, the process proceeds to step S7. In this case, the setting information is transmitted from the feature quantity setting information read unit 63 to the reflection section 48 via the setting information determination section 46. Accordingly, processing based on the setting information is reflected in the one-frame image stored in the delay section 47, and the processed image is displayed on the display unit 15.

The process from step S1 to S4, the process from step S9 to S13, and the process from step S7 to S8 correspond to processing performed in the reproduction mode described previously with reference to FIGS. 1 and 2.

In the above-described process, if a user reproduces a previously recorded image, and designates processing to be performed on the image being reproduced by operating the remote controller 14, setting information representing details of the designated processing to be performed on the image is stored along with the feature quantity of the image. Since the setting information is associated with the feature quantity and is then stored, the feature quantity of the image being reproduced can be used as a time code that is set on a frame-by-frame basis, and therefore can be synchronized with a stored feature quantity. Accordingly, processing based on setting information associated with the synchronized stored feature quantity can be reflected in the image being reproduced.

Thus, editing processing based on the stored setting information can be reflected in the image without using a time code. Furthermore, since only the feature quantity and the setting information are stored, the previously recorded image is not recorded again. Accordingly, for example, even if the "copy once" rule is adopted for the previously recorded image, the image can be repeatedly reproduced in its edited form.

In the above-described description, among image signals configuring a one-frame image, an integrated value of pixel values of pixels included in the image data area is used as a feature quantity. However, a feature quantity may be another value such as a motion vector (global motion and local motion), a value indicating how often a specific waveform pattern occurs, an integrated value of pixel values of pixels in a size-reduced image, an integrated value of pixel values of pixels in a particular part of an image, the above-described values of a plurality of frames, or a combination of a plurality of above-described feature quantities.

If a user edits an image being reproduced by the image processing apparatus 13, it is difficult for the user to operate the remote controller 14 so that a plurality of setting items can be changed at the same time.

For example, if the user wants to change a zoom center point and a zoom factor of the image, it is desirable that setting items representing the zoom center point and the zoom factor be changed at the same time, because they are related to each other.

Setting items that are included in setting information and are related to each other include, for example, contrast, brightness, and color density. These three setting items are closely related to each other. If one of these setting items is controlled, the other two setting items are required to be controlled. In order to prevent the occurrence of black underexposed images and white overexposed images, values of these setting items are controlled.

However, it is difficult for a user to operate the remote controller 14 so that a plurality of setting items can be changed at the same time. Accordingly, the user usually performs editing of an image a plurality of times. For example, if a user wants to change a zoom center point and a zoom factor of an image, the user operates the remote controller 14 so as to change only one of them at a time as shown in FIG. 12.

Figure 12:
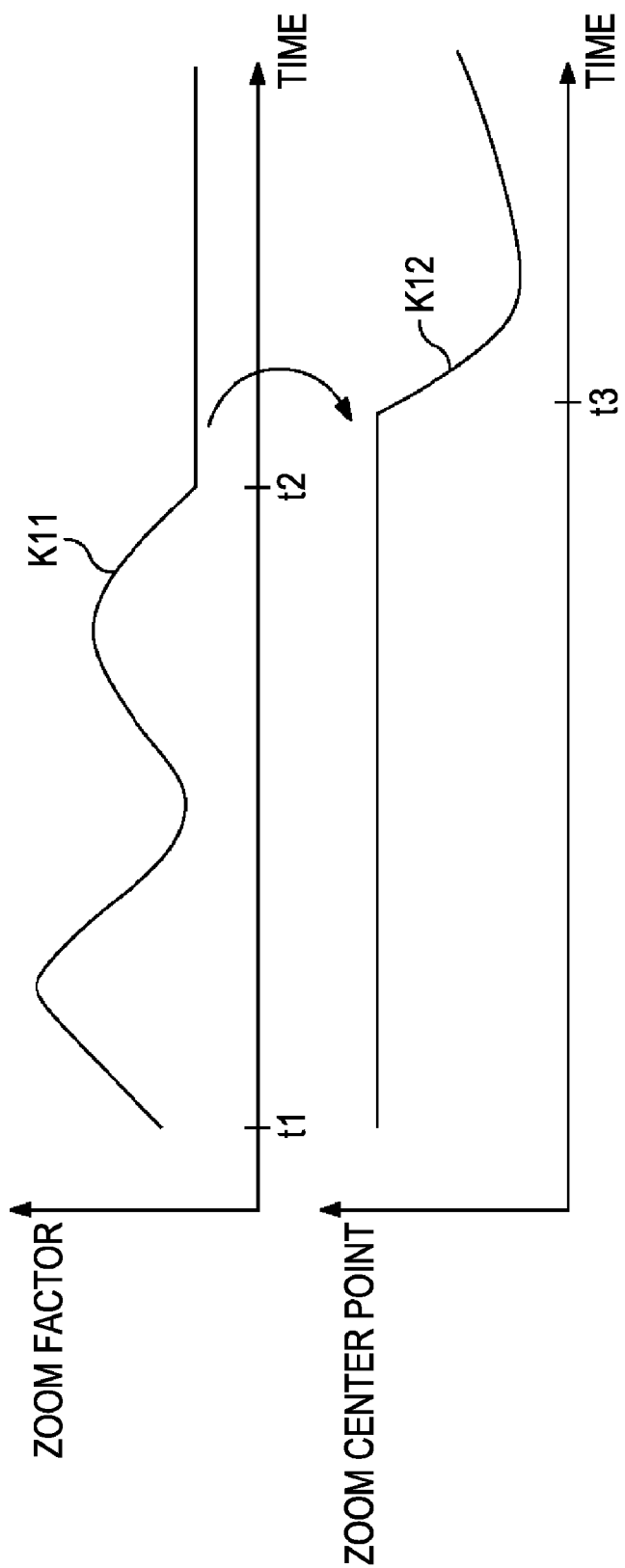
FIG. 12 is a diagram describing first editing.

In FIG. 12, vertical axes denote values of setting items, that is, a zoom factor and a zoom center point, and horizontal axes denote time. Furthermore, a curve K11 denotes a change in a zoom factor with the passage of time, and a curve K12 denotes a change in a zoom center point with the passage of time, the zoom factor and the zoom center point being setting items.

In a period from a time t1 to a time t2, if a user operates the remote controller 14 so as to change only the zoom factor, the zoom factor of an image represented by the curve K11 changes in accordance with the user's operation. On the other hand, since the user does not operate the remote controller 14 so as to change the zoom center point, a predetermined value thereof, that is, a value prior to editing, is maintained as represented by the curve K12.

If the user suspends the operation of the remote controller 14 at the time t2 and then restarts the operation thereof so as to change the zoom center point at a time t3, the zoom center point, which is a setting item, changes in accordance with the user's operation as represented by the curve K12. On the other hand, since the user does not operate the remote controller 14 so as to change the zoom factor after the time t2, a value designated at the time t2 is maintained as represented by the curve K11.

Setting information including setting items such as the zoom factor and the zoom center point set as described previously are stored in the feature quantity setting information storage unit 62 along with a feature quantity. Subsequently, if a user provides an instruction for reproducing an image, the image processing apparatus 13 reads out the setting information from the feature quantity setting information storage unit 62, and reflects processing based on the read setting information in the image to be reproduced.

Figure 13:
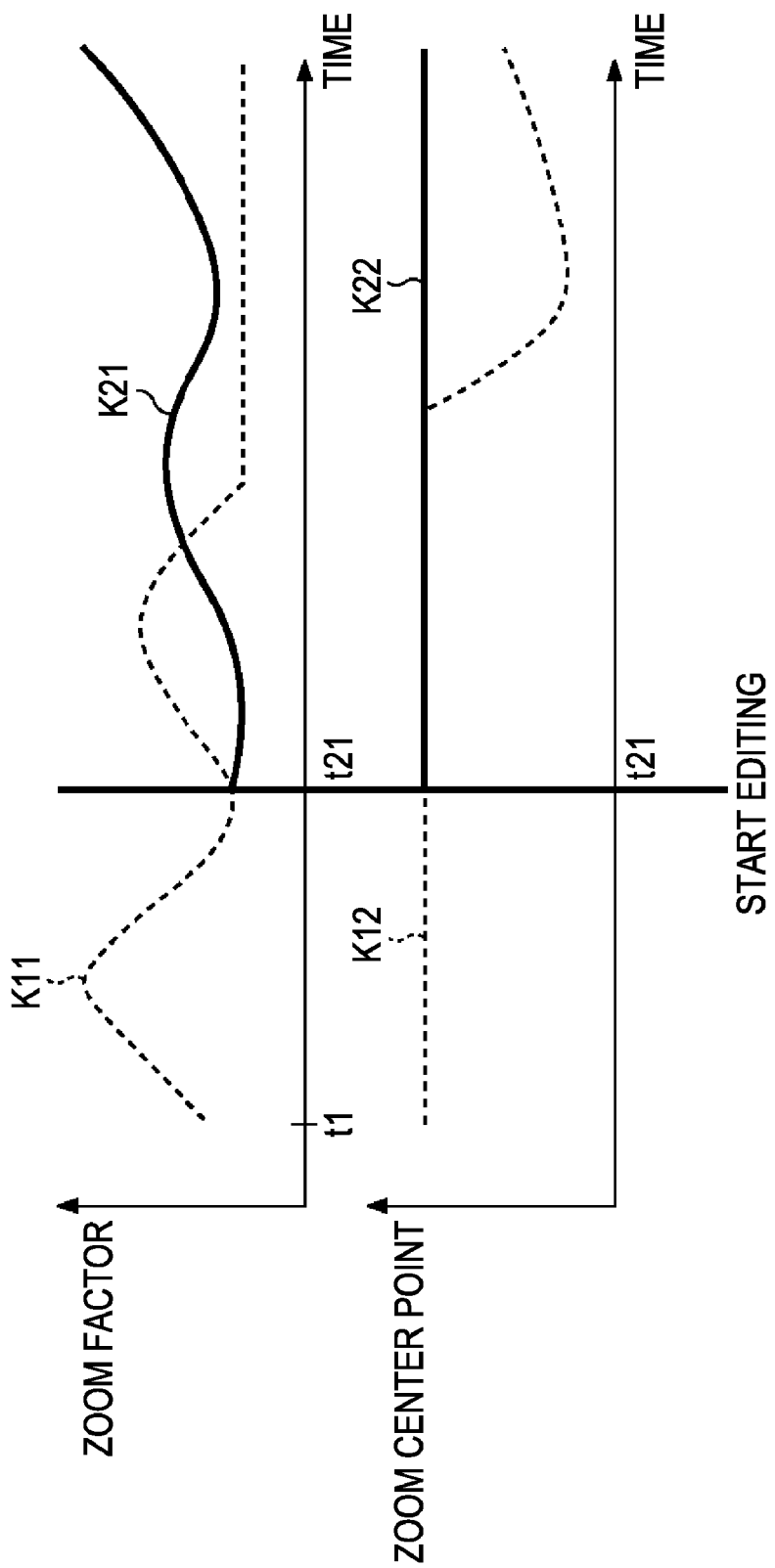
FIG. 13 is a diagram describing normal editing.

If the user provides an instruction for further editing the image by operating the remote controller 14 while the image is reproduced, for example, as shown in FIG. 13, the setting information stored in the feature quantity setting information storage unit 62 is rewritten in accordance with the user's operation.

In FIG. 13, vertical axes denote a zoom factor and a zoom center point and horizontal axes denote time. A curve K21 denotes a change in the zoom factor with the passage of time, and a curve K22 denotes a change in a zoom center point with the passage of time, the zoom factor and the zoom center point being setting items. Furthermore, a dotted curve K11 denotes the change in the zoom factor with the passage of time, the zoom factor being set as a setting item in the setting information stored in the feature quantity setting information storage unit 62, and a dotted curve K12 denotes the change in the zoom center point with the passage of time, the zoom center point being set as a setting item included in the setting information stored in the feature quantity setting information storage unit 62.

In a period from a time t1 to a time t21, the image is reproduced on the basis of values of the setting items represented by the curves K11 and K12. Subsequently, at the time t21, if a user operates the remote controller 14 so as to change the zoom factor, the zoom factor of the image, which is the setting item, changes in accordance with the user's operation as represented by the curve K21 after the time t21. On the other hand, after the time t21, the instruction for changing the zoom factor continues to be provided, but an instruction for changing a value of the zoom center point is not provided by the user with the remote controller 14. Accordingly, it is determined that a value set at the time t21 is a value designated by a user's instruction, and the value set at the time t21 is maintained as represented by the curve K22.

That is, in the period from t1 to t21, the feature quantity setting information read unit 63 reads out the setting information from the feature quantity setting information storage unit 62, and supplies the read setting information to the setting information determination section 46. Subsequently, the reflection section 48 reflects details of editing based on the setting information transmitted from the setting information determination section 46 in the image. The edited image is displayed on the display unit 15.

If the user operates the remote controller 14 so as to change the zoom factor at the time t21, the setting information determination section 46 sets the setting information that was last transmitted from the feature quantity setting information read unit 63 so that only the setting item for the zoom factor has a value in accordance with the user's operation among setting items included in the setting information, and supplies the set setting information to the feature quantity setting information recording unit 61 so as to cause it to store the setting information in the feature quantity setting information storage unit 62. At that time, it is determined that, among the setting items included in the setting information, the setting items other than the setting item for the zoom factor are made to maintain their values at that time. Accordingly, the values of the other setting items included in the setting information that was last transmitted from the feature quantity setting information read unit 63 are maintained.

Accordingly, even though the user did not operate the remote controller 14 so that the value of the zoom center point, which is set as a setting item in the setting information stored in the feature quantity setting information storage unit 62, can be changed after the time t21, it is determined that the user has operated the remote controller 14 so as to set the value of the zoom center point to the value at the time t21. Accordingly, an original value is rewritten with the value at the time t21 after the time t21. That is, after reediting, such a zoom center point, which is a setting item, does not reflect details of the first editing described previously with reference to FIG. 12.

Accordingly, when image editing is performed, setting information may be set so that only a setting item designated by a user can be changed.

In the following description, in an edit mode, the case described previously with reference to the flowcharts shown in FIGS. 13 and 7 in which setting information is set so that all setting items are rewritten regardless of whether a user has operated the remote controller 14 so as to change values of all the setting items is referred to as a normal edit mode. A case in which setting information is set so that only a setting item designated by a user can be changed is referred to as a partial edit mode.

Figure 14:
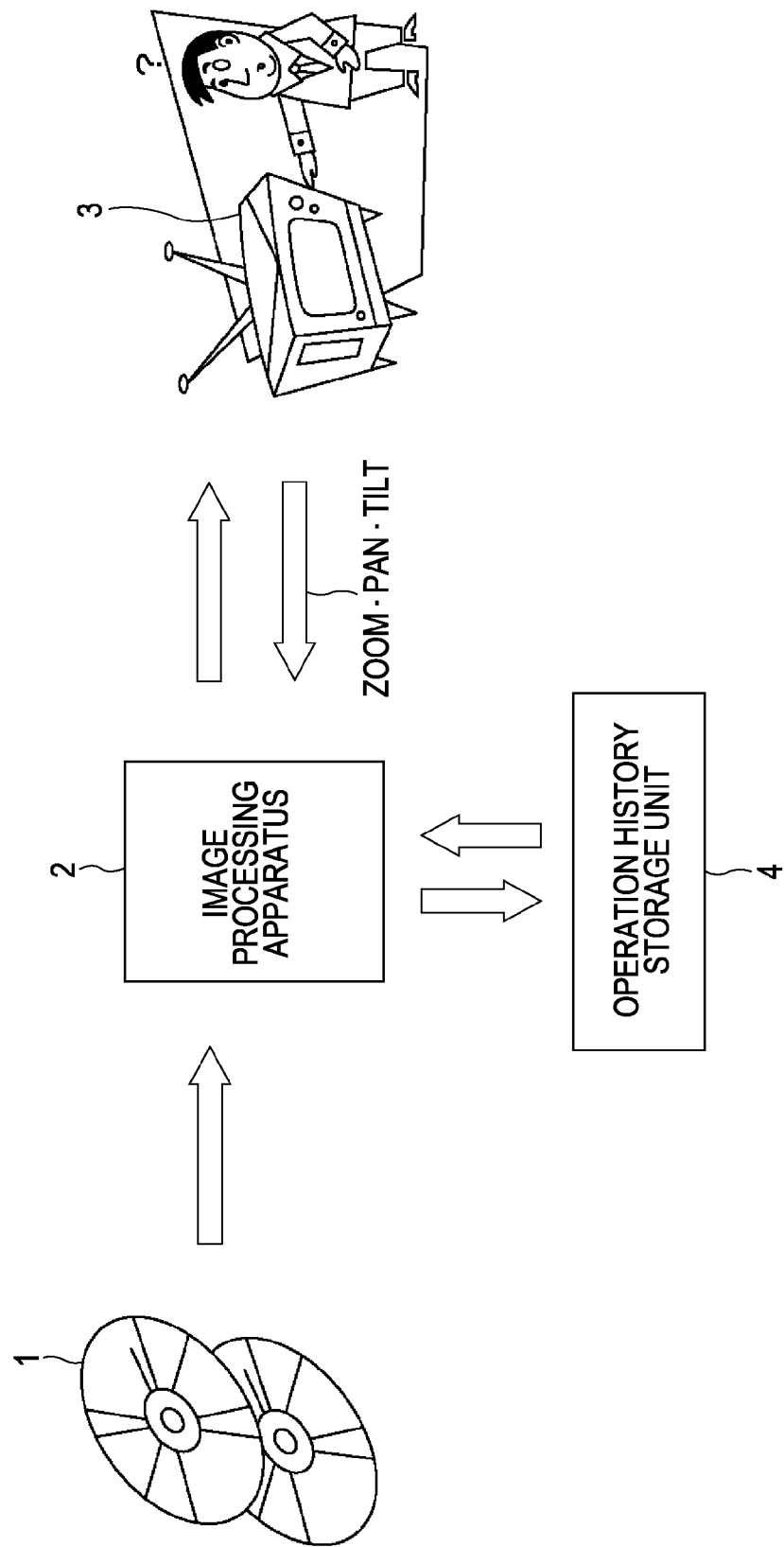
FIG. 14 is a diagram describing a concept of an image processing apparatus according to an embodiment of the present invention.

FIG. 14 is a diagram describing a concept of the partial edit mode. In FIG. 14, the same reference numerals are used for portions corresponding to the portions shown in FIG. 1.

In the partial edit mode, as shown in FIG. 14, the image processing apparatus 2 displays on a display unit 3 an image reproduced from a recording medium 1 such as a DVD (Digital Versatile Disc) that records content including a moving image in advance by means of, for example, a DVD player. In this state, if a user provides an instruction for desired processing such as zoom, pan, or tilt control to be performed upon the image by operating a remote controller or the like, the image processing apparatus 2 sets setting information on the basis of details of the user's operation of the remote controller so that only a setting item designated by the user can be changed among a plurality of setting items included in the setting information, performs processing corresponding to the setting information upon the image, and displays the processed image on the display unit 3. Furthermore, the image processing apparatus 2 extracts a feature quantity from the image, and records the setting information along with the extracted feature quantity in the operation history storage unit 4.

Here, the recording medium 1, the image processing apparatus 2, the display unit 3, and the operation history storage unit 4 shown in FIG. 14 correspond to the recording medium 11, the image processing apparatus 13, the display unit 15, and the feature quantity setting information storage unit 62, respectively.

In the image processing apparatus 13, a user can select one of the normal edit mode and the partial edit mode by operating the remote controller 14. If a user selects the normal edit mode or the partial edit mode by operating the remote controller 14, the light-receiving section 44 converts light emitted from the remote controller 14 into an operation signal of the remote controller 14 on the basis of a light-emitting pattern of the light. The operation information recognition section 45 controls each component included in the image processing apparatus 13 in accordance with the operation signal transmitted from the light-receiving section 44 so that each component performs processing corresponding to the normal edit mode or the partial edit mode.

For example, if the user selects the normal edit mode by operating the remote controller 14, the image processing apparatus 13 performs the image processing described previously with reference to FIG. 7.

Figure 15:
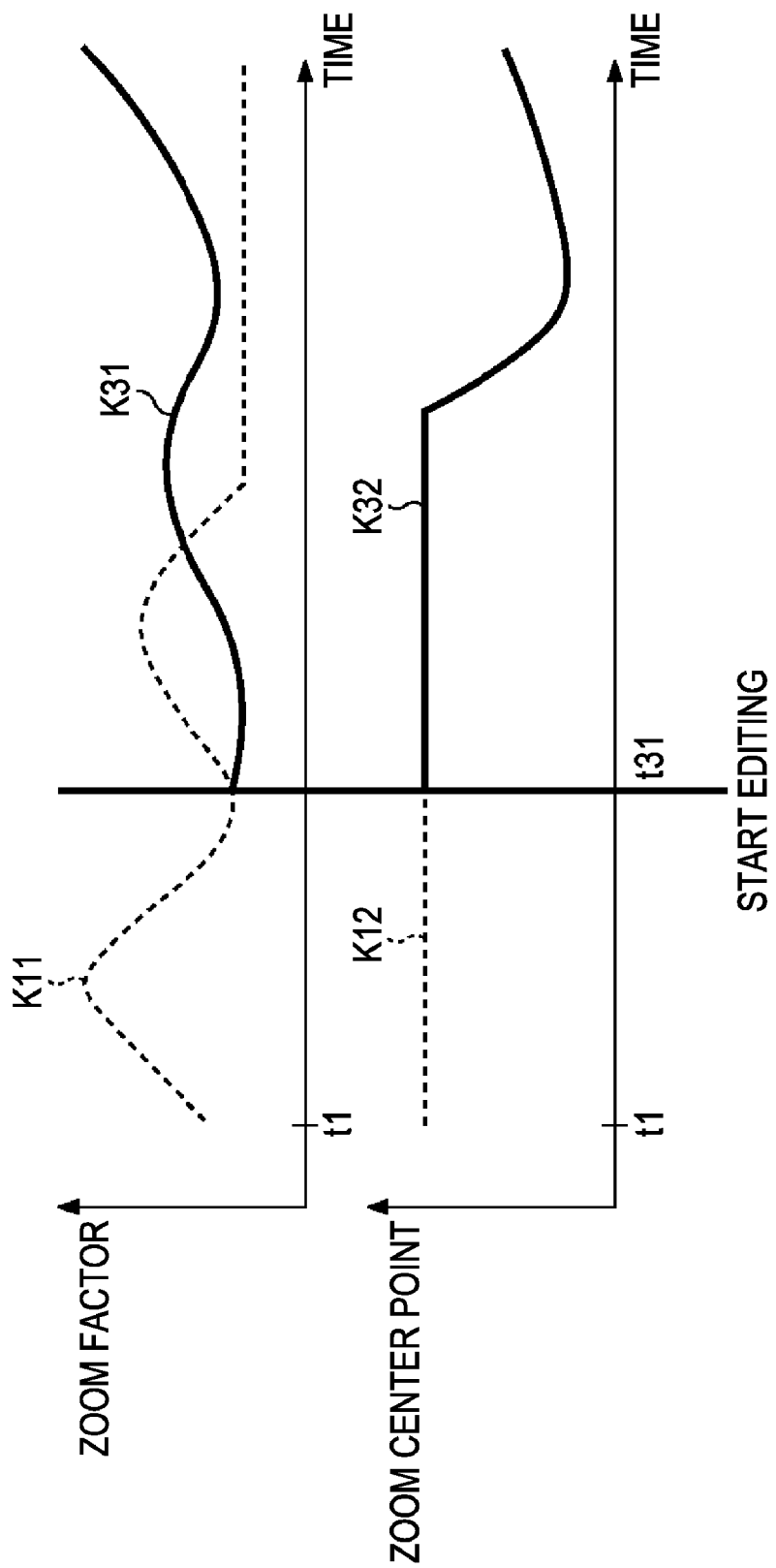
FIG. 15 is a diagram describing partial editing.

On the other hand, for example, as described previously with reference to FIG. 12, while an image that has been edited in such a manner as to change setting items, that is, a zoom factor and a zoom center point thereof, is reproduced, if the user selects the partial edit mode and provides an instruction for editing the image by operating the remote controller 14, only the setting items designated by the user are rewritten in accordance with the user's operation among setting items included in setting information stored in the feature quantity setting information storage unit 62 as shown in, for example, FIG. 15.

In FIG. 15, vertical axes denote a zoom factor and a zoom center point and horizontal axes denote time. A curve K31 denotes a change in the zoom factor with the passage of time, and a curve K32 denotes a change in a zoom center point with the passage of time, the zoom factor and the zoom center point being setting items. Furthermore, the dotted curve K11 denotes the change in a zoom factor with the passage of time, the zoom factor being set as a setting item in the setting information stored in the feature quantity setting information storage unit 62, and the dotted curve K12 denotes the change in a zoom center point with the passage of time, the zoom center point being set as a setting item included in the setting information stored in the feature quantity setting information storage unit 62.

In a period from a time t1 to a time t31, the image is reproduced on the basis of values of the setting items represented by the curves K11 and K12. Subsequently, at the time t31, if a user operates the remote controller 14 so as to change the zoom factor, the zoom factor of the image, which is the setting item, changes in accordance with the user's operation after the time t31 as represented by the curve K31. On the other hand, after the time t31, an instruction for changing a value of the zoom center point is not provided by the user with the remote controller 14. Accordingly, the value of the zoom center point at each time set as a setting item included in the setting information stored in the feature quantity setting information storage unit 62 is maintained as represented by the curve K32.

That is, in the partial edit mode, in the case of an image that has undergone editing, setting information is set so that a value of only a setting item newly designated by a user can be changed among setting items included in setting information of the image. In the case of the other setting items that are not newly designated by the user, values previously set in the past editing are maintained.

Next, image processing performed by the image processing apparatus 13 when a user selects the partial edit mode will be described with reference to a flowchart shown in FIG. 16.

In step S81, the delay section 47 determines whether a new image has been transmitted from the image reproduction unit 12. If it is determined in step S81 that a new image has not yet been transmitted, the delay section 47 repeatedly performs the processing of step S81 until a new image has been transmitted.

On the other hand, for example, if the image reproduction unit 12 reads out an image recorded on the recording medium 11 and supplies the read image to the delay section 47 and the delay section 47 determines that a new image has been transmitted from the image reproduction unit 12, the process proceeds to step S82 in which the delay section 47 temporarily stores one frame of the transmitted image so as to delay it.

In step S83, the feature quantity extraction section 41 performs feature quantity extraction processing so as to extract a feature quantity from one frame of the image transmitted from the image reproduction unit 12. That is, when the delay section 47 temporarily stores a new one-frame image so as to delay it, the new one-frame image is also supplied to the feature quantity extraction section 41. At the same time, the same image is temporarily stored for delay processing and is subjected to the feature quantity extraction processing. The feature quantity extraction processing performed in step S83 is the same as the feature quantity extraction processing described previously with reference to FIG. 8, and the description thereof will be therefore omitted.

In step S84, the synchronization detection section performs synchronization detection processing so as to detect synchronization between the feature quantity of the image being reproduced and a feature quantity associated with setting information used to process the image. The synchronization detection processing performed in step S84 is the same as the synchronization detection processing described previously with reference to FIG. 10, and the description thereof will be therefore omitted.

After the synchronization detection processing has been performed, in step S85, the feature quantity setting information read unit 63 determines whether feature quantities that match the reproduction position feature quantity of the frame being reproduced have been stored in the feature quantity setting information storage unit 62. That is, the feature quantity setting information read unit 63 determines whether feature quantities synchronized with the reproduction position feature quantity of the frame being reproduced have been stored in the feature quantity setting information storage unit 62. For example, if synchronous position information has been transmitted from the synchronization detection section 42 to the feature quantity setting information read unit 63, feature quantities that match the reproduction position feature quantity of the frame being reproduced have already been stored in the feature quantity setting information storage unit 62. In this case, it is determined that feature quantities that match the reproduction position feature quantity of the frame being reproduced have been stored in the feature quantity setting information storage unit 62.

If it is determined in step S85 that feature quantities synchronized with the reproduction position feature quantity of the frame being reproduced have not been stored, the processing of step S86 is skipped and the process proceeds to step S87.

On the other hand, if it is determined in step S85 that feature quantities synchronized with the reproduction position feature quantity of the frame being reproduced have been stored, the process proceeds to step S86 in which the feature quantity setting information read unit 63 determines whether setting information corresponding to the synchronized feature quantity has been stored in the feature quantity setting information storage unit 62. That is, since it is possible to store only a feature quantity along with no setting information in the feature quantity setting information storage unit 62, it is determined whether there is setting information corresponding to the synchronized feature quantity in this processing.

If it is determined in step S86 that the setting information corresponding to the synchronized feature quantity has not been stored, or if it is determined in step S85 that the synchronized feature quantity has not been stored, in step S87, the feature quantity setting information read unit 63 sets setting information by setting a predetermined standard value as a value of each setting item in setting information, because the setting information is not stored in the feature quantity setting information storage unit 62. The feature quantity setting information read unit 63 supplies the setting information in which the standard value is set to the setting information determination section 46. Subsequently, the process proceeds to step S89.

On the other hand, if it is determined in step S86 that the setting information has been stored, the process proceeds to step S88 in which the feature quantity setting information read unit 63 reads out the setting information corresponding to the feature quantity that is set as the synchronous position information from the feature quantity setting information storage unit 62, and supplies the read setting information to the setting information determination section 46.

If the standard value is set for each setting item included in the setting information in step S87, or if the setting information corresponding to the feature quantity that is set as the synchronous position information is read out in step S88, in step S89, the setting information determination section 46 determines whether a recording in progress flag has been set.

The setting information determination section 46 stores the recording in progress flag indicating whether predetermined processing is performed on an image in accordance with a user's operation and a feature quantity and setting information are recorded, that is, indicating whether editing is being performed upon the image. If editing of the image is being performed, the recording in progress flag is set. If editing of the image is not being performed, the recording in progress flag is unset.

If it is determined in step S89 that the recording in progress flag has been set, the feature quantity and the setting information are stored together in the feature quantity setting information storage unit 62. Accordingly, the process proceeds to step S92.

On the other hand, if it is determined in step S89 that the recording in progress flag has not been set, the process proceeds to step S90 in which the operation information recognition section 45 determines whether a user has provided an instruction for image processing by operating the remote controller 14. For example, if the user provided an instruction for zoom processing with a zoom factor of 2 while seeing an image displayed on the display unit 15, the light-receiving section 44 receives a light-emitting pattern from the remote controller 14, and supplies a signal based on the received light-emitting pattern to the operation information recognition section 45. Upon receiving the signal from the light-receiving section 44, the operation information recognition section 45 determines that the remote controller 14 has been operated.

If it is determined in step S90 that the remote controller 14 has been operated, the operation information recognition section 45 recognizes operation information corresponding to user's desired processing to be performed on the image on the basis of the operation signal transmitted from the light-receiving section 44, and supplies the recognition result to the setting information determination section 46. If the operation information is transmitted from the operation information recognition section 45 to the setting information determination section 46, the process proceeds to step S91.

In step S91, the setting information determination section 46 sets the stored recording in progress flag. Subsequently, the process proceeds to step S92.

If the recording in progress flag is set in step S91, or if it is determined in step S89 that the recording in progress flag has been set, the image processing apparatus 13 performs recording processing in step S92. Subsequently, the process proceeds to step S93. Although details of the recording processing will be described later, in the recording processing, the image processing apparatus 13 reflects details of the operation of the remote controller 14 performed by the user in the stored setting information, and stores the processed setting information.

If it is determined in step S90 that the remote controller 14 has not been operated, the setting information determination section 46 supplies the stored setting information to the reflection section 48. Subsequently, the process proceeds to step S93.

If it is determined in step S90 that the remote controller 14 has not been operated, or if the recording processing has been performed in step S92, in step S93, the reflection section 48 performs processing upon the image stored in the delay section 47 on the basis of the setting information transmitted from the setting information determination section 46 so as to reflect processing corresponding to the user's instruction in the image. Subsequently the reflection section 48 displays the processed image on the display unit 15.

In step S94, the operation information recognition section 45 determines whether an instruction for terminating the operation has been provided. If it is determined that the instruction for terminating the operation has been provided, the process ends. On the other hand, if it is determined that the instruction for terminating the operation has not yet been provided, the process returns to step S81 and the above-described process is repeated.

Thus, the image processing apparatus 13 stores setting information representing details of processing performed on an image designated by a user along with a feature quantity of the image. Furthermore, the image processing apparatus 13 reflects the processing in an image being reproduced on the basis of the setting information corresponding to the feature quantity, and displays the processed image.

Thus, setting information representing details of processing performed on an image designated by a user is stored along with a feature quantity of the image, whereby predetermined processing can be accurately performed upon an original image and the processed image can be reproduced each time the original image is reproduced without making modifications to the original image.

Next, the recording processing performed in step S92 shown in FIG. 16 will be described with reference to a flowchart shown in FIG. 17.

In step S121, the setting information determination section 46 acquires the operation information transmitted from the operation information recognition section 45.

In step S122, the setting information determination section 46 determines whether the recording processing has been completed. Operation information indicating an instruction for terminating recording of setting information, which represents details of processing performed on the image, is sometimes transmitted from the operation information recognition section 45 to the setting information determination section 46. Upon receiving such operation information indicating an instruction for terminating recording, the setting information determination section 46 determines that the recording processing has been completed.

If it is determined in step S122 that the recording processing has not yet been completed, storing of setting information in the feature quantity setting information storage unit 62 is required to be further performed. Accordingly, the process proceeds to step S123 in which the setting information determination section 46 reflects details of the operation represented by the acquired operation information in the stored setting information. The setting information determination section 46 supplies the processed setting information in which the details of the operation has been reflected to the reflection section 48 and the feature quantity setting information recording unit 61.

For example, if the details of the operation represented by the acquired operation information is an instruction for performing zoom processing with a zoom factor of 2 on the image, the setting information determination section 46 resets only the value of a setting item for the zoom factor among a plurality of setting items included in the stored setting information so that the zoom processing with the zoom factor of 2 can be performed on the image. Accordingly, among the setting items included in the setting information stored by the setting information determination section 46, values of setting items other than the setting item corresponding to the details of processing represented by the operation information are maintained. That is, among the setting items included in the setting information, only the setting item designated by the user is changed in accordance with the user's operation.

If the details of the user's operation is reflected in the setting information, in step S124, the feature quantity setting information recording unit 61 records the feature quantity transmitted from the feature quantity extraction section 41 along with the setting information corresponding to the feature quantity which has been transmitted from the setting information determination section 46 in the feature quantity setting information storage unit 62. Consequently, the feature quantity and the setting information are associated with each other and are then stored. Subsequently, the process proceeds to step S93 shown in FIG. 16.

For example, if the feature quantity setting information storage unit 62 stores the feature quantities C1 to C3 shown in FIG. 9, the feature quantity setting information recording unit 61 adds the feature quantity transmitted from the feature quantity extraction section 41 to the end of the feature quantities stored in the feature quantity setting information storage unit 62, that is, after the last feature quantity C3, and records the setting information corresponding to the transmitted feature quantity at an address obtained by multiplying the address at which the transmitted feature quantity is recorded by m.

Thus, the feature quantity transmitted from the feature quantity extraction section 41 is added to the end of the feature quantities recorded in the feature quantity setting information storage unit 62. If a synchronized feature quantity is retrieved, the retrieval processing is performed in turn from the last feature quantity in the feature quantity setting information storage unit 62. Consequently, even if editing is performed a plurality of times on the same frame image, a feature quantity corresponding to setting information obtained when the last editing has been performed is always retrieved.

If it is determined in step S122 that the recording processing has been completed, the process proceeds to step S125 in which the setting information determination section 46 unsets the stored recording in progress flag. The setting information determination section 46 supplies the stored setting information to the reflection section 48. Subsequently, the process proceeds to step S93 shown in FIG. 16.

Thus, if a user provides an instruction for image processing to be performed on an image, the image processing apparatus 13 sets setting information so that only a setting item designated by the user can be changed among a plurality of setting items included in the setting information.

Thus, setting information is set so that only a designated setting item can be changed. Consequently, even if it is difficult to change a plurality of setting items at the same time by operating the remote controller 14, setting information can be easily set so that values of the setting items are changed to desired values.

As described previously, setting information representing details of processing performed on an image designated by a user is stored along with a feature quantity of the image. Consequently, predetermined processing can be accurately performed upon an original image and the processed image can be reproduced each time the original image is reproduced without making modifications to the original image.

In the above-described description, setting information has a plurality of setting items. However, a piece of setting information may be composed of a plurality of correlated parameters. Setting information may be set so that only one of the parameters can be changed. In this case, for example, if a piece of setting information is composed of a combination of two parameters, that is, a parameter representing a zoom factor and a parameter representing a zoom center point, a user can set the setting information by operating the remote controller 14 so that a value of only one of the two parameters configuring the setting information can be changed.

The above-described processing flow may be performed by hardware or software. If the processing flow is performed by software, a program configuring the software is installed from a program recording medium on a computer embedded in a piece of dedicated hardware or, for example, on a general-purpose personal computer that is allowed to perform various functions by installing various programs thereon.

Figure 18:
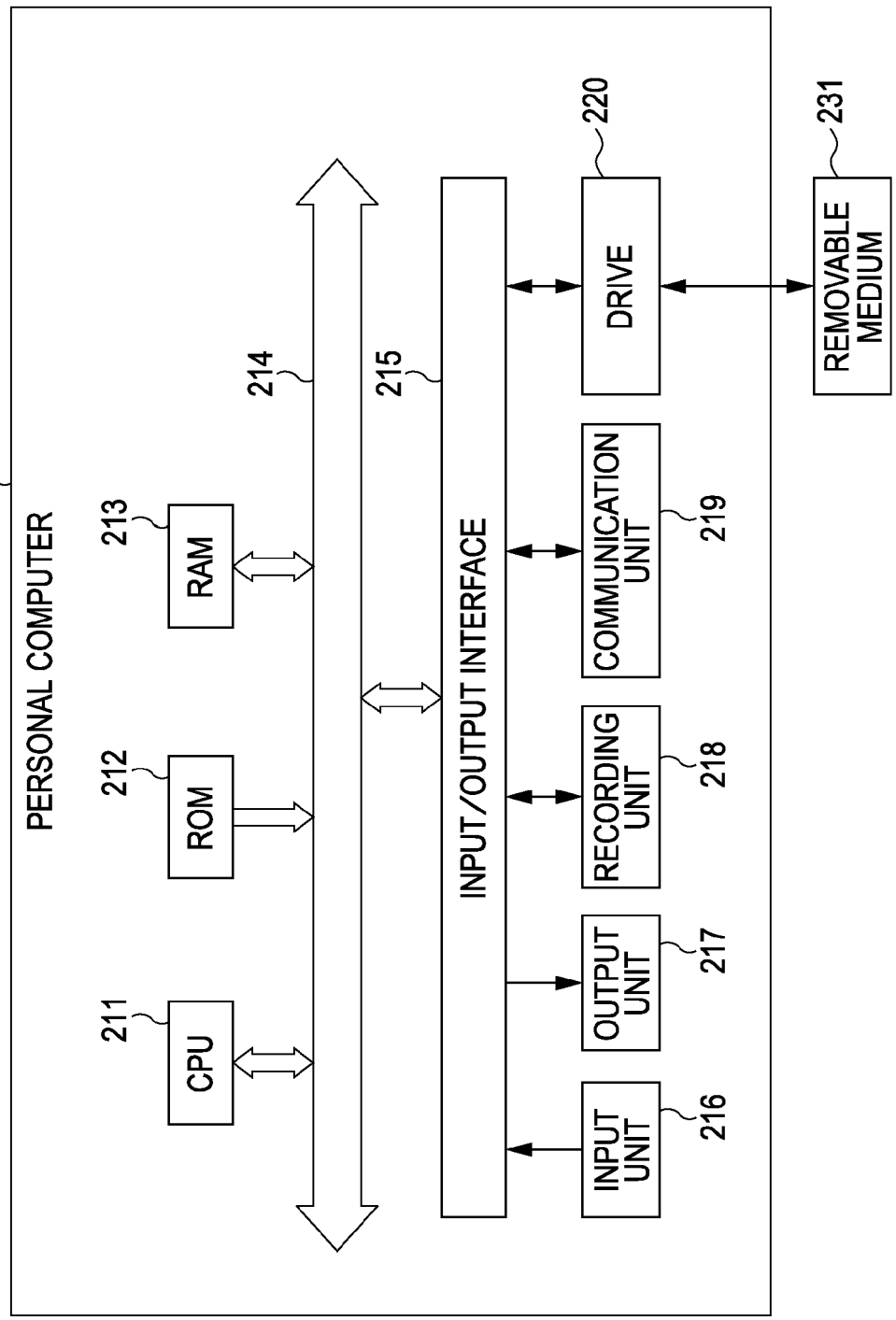
FIG. 18 is a block diagram showing a configuration of a personal computer.

FIG. 18 is a block diagram showing an exemplary configuration of a personal computer that performs the above-described processing flow using a program. A CPU (Central Processing Unit) 211 included in a personal computer 201 performs various pieces of processing in accordance with a program stored in a ROM (Read-Only Memory) 212 or a recording unit 218. A RAM (Random Access Memory) 213 stores a program to be executed by the CPU 211 and data as appropriate. The CPU 211, the ROM 212, and the RAM 213 are connected to each other via a bus 214.

The CPU 211 is also connected to an input/output interface 215 via the bus 214. The input/output interface 215 is connected to an input unit 216 configured with a keyboard, a mouse, and a microphone, and an output unit 217 configured with a display and a speaker. The CPU 211 performs various pieces of processing in accordance with instructions input from the input unit 216, and outputs the result of processing to the output unit 217.

The recording unit 218 connected to the input/output interface 215 is configured with, for example, a hard disk, and stores a program to be executed by the CPU 211 and various pieces of data. A communication unit 219 communicates with an external apparatus via a network such as the Internet or a local area network.

A program may be acquired via the communication unit 219 and may be stored in the recording unit 218.

When a removable medium 231 such as a magnetic disk, an optical disc, a magneto-optical disk, or a semiconductor memory is attached to a drive 220 connected to the input/output interface 215, the drive 220 drives the removable medium 231 to acquire a program or data recorded thereon. The acquired program or data is transferred to the recording unit 218 as appropriate, and is then recorded in the recording unit 218.

As shown in FIG. 18, the program recording medium storing the program to be installed on the computer and to be executed by the computer includes: the removable medium 231 that is a package medium such as a magnetic disk (including a flexible disk), an optical disc (including a CD-ROM (Compact Disc-Read-Only Memory) and a DVD (Digital Versatile Disc)), a magneto-optical disk, or a semiconductor memory; the ROM 212 in which the program is temporarily or permanently stored; and the hard disk configuring the recording unit 218. The storage of the program on the program recording medium is performed via the communication unit 219 that is an interface such as a router or a modem using a wired or wireless communication medium such as a local area network, the Internet, or digital satellite broadcasting as appropriate.

In this description, the steps describing the program to be stored in the program recording medium do not have to be executed in chronological order described above. The steps may be concurrently or individually.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing method comprising:
   extracting, by a processor, a feature quality from an image;
   determining setting information based on operation information related to operation;
   storing the feature quality along with the setting information; and
   the extracting, the determining and the storing are repeatedly performed in an edit mode.

2. The image processing method according to claim 1, wherein the extracting includes extracting a sum of pixel values of pixels included in a predetermined area configuring the image as a feature quantity.

3. The image processing method according to claim 1, further comprising:
   synchronizing a feature quantity extracted from the image with a feature quantity stored; and
   reading out the setting information associated with a feature quantity synchronized with a feature quantity extracted from the image, and
   wherein, when the read setting information is reset and is then stored, the setting information is set so that only a designated setting item can be changed among a plurality of setting items configuring the read setting information.

4. The image processing method according to claim 1, further comprising:
   reflecting processing based on the setting information set in the image, and displaying an image in which the processing has been reflected.

5. The image processing method according to claim 1, wherein the operation is an instruction entered when the image is displayed.

6. The image processing method according to claim 5, wherein the instruction is entered by a user operating a remote controller.

7. The image processing method according to claim 1, wherein the operation information indicates processing to be performed on the image.

8. The image processing method according to claim 7, wherein the processing to be performed on the image includes at least one of zoom, pan or tilt control.

9. An image processing apparatus comprising:
   a feature extracting unit to extract a feature quality from an image;
   a setting unit to determine setting information based on operation information related to operation; and
   a storage unit to store the feature quality along with the setting information,
   wherein the extracting by the feature extracting unit, the determining by the setting unit and the storing by the storage unit are repeatedly performed in an edit mode.

10. The image processing apparatus according to claim 9, wherein the feature quantity extracting unit extracts a sum of pixel values of pixels included in a predetermined area configuring the image as a feature quantity.

11. The image processing apparatus according to claim 9, further comprising:
   a synchronizing unit to synchronize a feature quantity extracted from the image with a feature quantity stored in the storage unit; and
   a reading unit to read out the setting information associated with a feature quantity synchronized with a feature quantity extracted from the image, and
   wherein, when the read setting information is reset and is then stored, the setting unit sets the setting information so that only a designated setting item can be changed among a plurality of setting items configuring the read setting information.

12. The image processing apparatus according to claim 9, further comprising:

a reflecting unit to reflect processing based on the setting information set by the setting unit in the image, and to display an image in which the processing has been reflected.

13. The image processing apparatus according to claim 9, wherein the operation is an instruction entered when the image is displayed.

14. The image processing apparatus according to claim 13, wherein the instruction is entered by a user operating a remote controller.

15. The image processing apparatus according to claim 9, wherein the operation information indicates processing to be performed on the image.

16. The image processing apparatus according to claim 15, wherein the processing to be performed on the image includes at least one of zoom, pan or tilt control.

17. An image processing apparatus comprising:
feature extracting means for extracting a feature quality from an image;
setting means for determining setting information based on operation information related to operation; and
storing means for storing the feature quality along with the setting information,
wherein the extracting by the feature extracting means, the determining by the setting means and the storing by the storing means are repeatedly performed in an edit mode.

18. A non-transitory computer readable medium storing a program causing a computer to perform:
extracting a feature quality from an image;
determining setting information based on operation information related to operation; and
storing the feature quality along with the setting information,
wherein the extracting, the determining and the storing are repeatedly performed in an edit mode.

* * * * *